US012750801B2

(12) United States Patent
Damman et al.

(10) Patent No.: US 12,750,801 B2
(45) Date of Patent: Sep. 29, 2026

(54) SIGNAL-AGNOSTIC APPARATUS, SYSTEM, AND METHOD FOR DOPPLER CORRECTION

(71) Applicant: The United States of America as represented by the Secretary of the Navy, San Diego, CA (US)

(72) Inventors: Salwan Sabah Damman, El Cajon, CA (US); Brendan Michael Hill, San Diego, CA (US); Ryan Skyler Hiser, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 372 days.

(21) Appl. No.: 18/658,841

(22) Filed: May 8, 2024

(65) Prior Publication Data

US 2025/0351105 A1 Nov. 13, 2025

(51) Int. Cl.
*H04W 56/00* (2009.01)

(52) U.S. Cl.
CPC .................................. *H04W 56/004* (2013.01)

(58) Field of Classification Search
CPC .................................................... H04W 56/004
See application file for complete search history.

(56) References Cited

U.S. PATENT DOCUMENTS 3,167,762 A * 1/1965 Murgio ..................... G01S 1/02 342/99
3,450,842 A * 6/1969 Lipke ....................... H04B 7/01 370/481
3,715,663 A * 2/1973 Laughlin .................. H04B 7/01 455/75

(Continued)

FOREIGN PATENT DOCUMENTS

CA 2602264 A1 * 10/2006 ........... H04B 17/336
CN 101184077 A * 5/2008

(Continued)

OTHER PUBLICATIONS

K. Weththasinghe, Y. He, Q. Tu Ngo, B. Jayawickrama and E. Dutkiewicz, "Demonstration Platform to Emulate Cognitive GEO-LEO Dual Satellite System," in IEEE Access, vol. 13, pp. 139904-139919, 2025, (Year: 2025).*

(Continued)

*Primary Examiner* — Berhanu Tadese
(74) *Attorney, Agent, or Firm* — Naval Information Warfare; Kyle Eppele

(57) ABSTRACT

A Signal-Agnostic Apparatus, System, and Method for Doppler Correction. In one embodiment, for the correction of significant Doppler shifts such as those present in signal transmissions involving satellites in low-earth orbit. The frequency locked loop apparatus and system for correcting Doppler frequency offset comprising an amplitude normalizer, a positive, a negative frequency band edge filter having a plurality of negative band edge coefficients, a positive or (Continued)

negative frequency content filter output for calculating a raw Doppler frequency offset, a leaky integrator, a zero-crossing counter, a plurality of locking filters, a plurality of tracking filters, an array, and a numerically controlled oscillator.

17 Claims, 13 Drawing Sheets
(10 of 13 Drawing Sheet(s) Filed in Color)

(56) References Cited

U.S. PATENT DOCUMENTS 4,069,468 A * 1/1978 Bartram ............... G01R 23/167 367/905
5,432,521 A * 7/1995 Siwiak ............... H04B 7/18517 455/12.1
5,703,595 A * 12/1997 Tayloe .............. H04W 56/0035 342/175
6,058,306 A * 5/2000 Liu ........................ H04B 7/208 455/430
6,532,271 B1 * 3/2003 Hwang ............... H04L 27/2278 375/345
6,850,505 B1 * 2/2005 Ostberg ................. H04B 1/712 370/335
7,558,576 B2 * 7/2009 Chen .................... H04B 17/336 455/504
8,116,419 B2 * 2/2012 Jiang ................. H04W 56/0035 375/372
8,165,230 B2 * 4/2012 Ragab ................. H04L 25/0224 375/150
8,165,547 B2 * 4/2012 Hong ................... H04B 1/0067 455/208
8,391,780 B2 * 3/2013 Fruit .................... H04B 7/1855 342/353
8,648,742 B2 * 2/2014 Khajehnejad ....... H03M 1/1265 341/122
8,872,688 B2 * 10/2014 Gangopadhyay ....... H03M 1/38 341/122
9,294,312 B2 * 3/2016 Kil ...................... H04L 27/0014
9,497,721 B2 * 11/2016 You ................... H04W 56/0015
9,544,028 B2 * 1/2017 Siwiak .............. H04W 56/0035
9,831,899 B1 * 11/2017 Boghrat ................ H03F 1/3247
10,004,052 B2 * 6/2018 Kim .................... H04W 56/004
10,194,269 B2 * 1/2019 Venkataraman .......... G01S 5/12
10,348,355 B2 * 7/2019 Camacho Perez ...... G06F 3/015
10,454,533 B1 * 10/2019 Kogiantis ................ H04B 7/01
10,511,337 B2 * 12/2019 Boghrat ................ H03F 1/3247
10,539,671 B2 * 1/2020 Lee ................... H04W 56/0035
10,608,780 B2 * 3/2020 Angelopoulos ....... H04L 1/0009
10,630,403 B2 * 4/2020 Zhang ...................... H04B 7/01
10,637,709 B2 * 4/2020 Bai ....................... H04L 5/0048
10,659,107 B2 * 5/2020 Myers ................ H04B 7/18515
10,965,423 B2 * 3/2021 Sakamoto ................ H04B 7/01
10,992,398 B1 * 4/2021 Myers ...................... H04B 7/01
11,165,463 B1 * 11/2021 Williams ............. H04B 1/1036
11,258,471 B2 * 2/2022 Boghrat .................. H03F 3/245
11,575,406 B1 * 2/2023 Williams ............... H04B 1/123
11,595,116 B2 * 2/2023 Yao ...................... H04B 7/1858
11,606,376 B2 * 3/2023 Wee ...................... G06F 21/552
11,611,375 B2 * 3/2023 Newman ............... G01S 5/0027
11,770,159 B2 * 9/2023 Chen ........................ H04B 7/01 370/329
12,028,365 B2 * 7/2024 Wee ...................... G06F 21/552
12,088,399 B2 * 9/2024 Xu ..................... H04B 7/18513
12,101,170 B2 * 9/2024 Miao .................. H04B 7/18513
12,119,922 B2 * 10/2024 Yao ...................... H04B 7/1858
12,136,966 B2 * 11/2024 Eriksson ............. H04B 7/1855
12,531,887 B2 * 1/2026 Wee ...................... G06F 21/552
12,567,901 B2 * 3/2026 Sun .................... H04B 7/18513
12,615,619 B2 * 4/2026 Liberg ............... H04B 7/18563
2007/0174876 A1 * 7/2007 Maggio ............... H04L 12/2836 725/78
2008/0056390 A1 * 3/2008 Rainbolt ............... H04L 25/022 375/260
2008/0171515 A1 * 7/2008 Kim .................... H04L 27/2657 455/63.1
2010/0290356 A1 * 11/2010 Hadad ............... H04W 56/0035 370/252
2012/0123284 A1 * 5/2012 Kheradvar ........... A61B 5/0215 600/509
2013/0329721 A1 * 12/2013 Doetsch .............. H04L 27/2672 370/350
2017/0075426 A1 * 3/2017 Camacho Perez ...... G06F 1/163
2017/0208600 A1 * 7/2017 Hsu .......................... H04B 7/01
2017/0222753 A1 * 8/2017 Angelopoulos ....... H04L 1/0043
2018/0062674 A1 * 3/2018 Boghrat .................. H03F 3/195
2018/0103444 A1 * 4/2018 Kim .................... H04W 56/001
2019/0057058 A1 * 2/2019 Anderson ............... G06F 13/28
2020/0119756 A1 * 4/2020 Boghrat ................ H03F 1/3247
2021/0029148 A1 * 1/2021 Wee ...................... G06F 21/552
2021/0321337 A1 * 10/2021 Myers ................. H04W 52/367
2021/0373147 A1 * 12/2021 Moon ................... G01S 13/534
2022/0070026 A1 * 3/2022 Chavva ................ H04B 7/0408
2022/0231711 A1 * 7/2022 Cox ....................... H04B 1/586
2023/0188553 A1 * 6/2023 Wee ...................... G06F 21/552 726/22
2023/0397161 A1 * 12/2023 Liberg ............... H04B 7/18563
2024/0048228 A1 * 2/2024 Sun .................... H04B 7/18513
2024/0097777 A1 * 3/2024 Mcgiffen .......... H04W 56/0065
2024/0259972 A1 * 8/2024 Li ......................... H04W 48/16
2024/0323215 A1 * 9/2024 Wee ...................... G06F 21/552
2024/0393380 A1 * 11/2024 Kobayashi ......... G01R 29/0892
2025/0047325 A1 * 2/2025 Eriksson Löwenmark ................ H04W 56/0035
2025/0047534 A1 * 2/2025 Yuan ................... H04L 25/0224
2025/0090033 A1 * 3/2025 Bettapalli Nagaraj ...................... A61B 5/02125
2025/0119208 A1 * 4/2025 Yao ...................... H04B 7/1858
2025/0167872 A1 * 5/2025 Dimitrov ................. H04B 1/16
2025/0351105 A1 * 11/2025 Damman ............ H04W 56/004
2025/0362414 A1 * 11/2025 Lee ....................... G01S 19/254
2026/0038034 A1 * 2/2026 Pascal .................... G06Q 40/02
2026/0113345 A1 * 4/2026 Wee .................... H04L 63/1425

FOREIGN PATENT DOCUMENTS

CN 100576768 C * 12/2009
CN 100583863 C * 1/2010 ......... H04L 27/2679
CN 101909024 A * 12/2010 ......... H04L 25/0222
CN 101980453 B * 2/2013
CN 118338407 A * 7/2020 ............ H04W 84/06
CN 118118993 A * 5/2024 ......... H04B 7/18519
CN 118234003 A * 6/2024 ........ H04W 56/0045
CN 118540195 A * 8/2024 ........... H04B 7/1851
CN 118338407 B * 9/2024 ............ H04W 84/06
DE 3828398 C2 * 5/1996 ........... G01S 15/582
DE 19729424 A1 * 2/1998 ......... H04B 7/18508
DE 102008013630 A1 * 2/2009 ............. G01S 19/05
DE 112013006535 T5 * 12/2015 ........ H04W 56/0035
EP 0389670 A2 * 10/1990 ............. G01S 13/60
EP 0481691 B1 * 4/1996 ........... G01S 15/582
EP 0901240 A2 * 3/1999 ........... H04B 7/1855
EP 1416692 A2 * 5/2004 ......... H04L 27/0014
EP 2490389 A1 * 8/2012 ......... H04L 27/2672
EP 1212871 B1 * 10/2012 ......... H04L 25/0202
EP 2555453 A1 * 2/2013 .......... H04J 14/0247
EP 2555453 B1 * 7/2013 ......... H04Q 11/0005
EP 2561710 B1 * 3/2016 ......... H04L 27/2657
EP 2314034 B1 * 11/2018 ........ H04W 56/0065
EP 3761583 A1 * 1/2021 ......... H04L 27/2639
EP 3993333 A1 * 5/2022 .......... H04W 56/004
EP 4089968 A1 * 11/2022 ........ H04W 56/0045
EP 3996458 B1 * 2/2024 ........ H04W 56/0035
EP 4233200 B1 * 3/2026 ......... H04B 7/18545
JP 2002261641 A * 9/2002
JP 2011250346 A * 12/2011
KR 100364786 B1 * 12/2002 ................ F21L 4/00
KR 100617786 B1 * 8/2006 ............. G01S 19/26
TW I712877 B * 12/2020 ............. G06F 1/163
TW 202139659 A * 10/2021 ............. G06N 3/045
WO WO-0117185 A1 * 3/2001 ............. H04B 1/712
WO WO-0122675 A1 * 3/2001 ......... H04L 27/2278

(56) References Cited

FOREIGN PATENT DOCUMENTS

| | | | | | |
|---|---|---|---|---|---|
| WO | WO-0133794 | A1 | * | 5/2001 | H04L 27/2278 |
| WO | WO-2006105297 | A2 | * | 10/2006 | H04B 7/01 |
| WO | WO-2008099410 | A2 | * | 8/2008 | H04B 7/01 |
| WO | WO-2012110143 | A1 | * | 8/2012 | H04B 7/18506 |
| WO | WO-2013139035 | A1 | * | 9/2013 | H04L 25/0224 |
| WO | WO-2013175951 | A1 | * | 11/2013 | H04L 27/2657 |
| WO | WO-2014120151 | A1 | * | 8/2014 | H04B 7/01 |
| WO | WO-2014187231 | A1 | * | 11/2014 | H04W 4/027 |
| WO | WO-2016184148 | A1 | * | 11/2016 | H04W 36/165 |
| WO | WO-2017048439 | A1 | * | 3/2017 | G06F 1/163 |
| WO | WO-2017080251 | A1 | * | 5/2017 | H04W 64/00 |
| WO | WO-2020037452 | A1 | * | 2/2020 | H04W 4/40 |
| WO | WO-2020089471 | A1 | * | 5/2020 | H04B 7/1855 |
| WO | WO-2020135503 | A1 | * | 7/2020 | H04L 27/0014 |
| WO | WO-2020166958 | A1 | * | 8/2020 | H04W 74/006 |
| WO | WO-2020236760 | A1 | * | 11/2020 | H04L 5/1461 |
| WO | WO-2020259454 | A1 | * | 12/2020 | H04W 56/004 |
| WO | WO-2021016307 | A1 | * | 1/2021 | H04L 67/34 |
| WO | WO-2021155738 | A1 | * | 8/2021 | H04W 56/0035 |
| WO | WO-2021183662 | A1 | * | 9/2021 | H04L 25/0204 |
| WO | WO-2021206961 | A1 | * | 10/2021 | H04W 72/23 |
| WO | WO-2022084958 | A1 | * | 4/2022 | H04B 7/18563 |
| WO | WO-2022145398 | A1 | * | 7/2022 | H04W 56/0065 |
| WO | WO-2022236540 | A1 | * | 11/2022 | H04W 36/249 |
| WO | WO-2023111965 | A1 | * | 6/2023 | H04B 7/18563 |
| WO | WO-2023173161 | A1 | * | 9/2023 | H04L 27/14 |
| WO | WO-2024020571 | A1 | * | 1/2024 | G06F 3/015 |
| WO | WO-2025063745 | A1 | * | 3/2025 | A61B 5/6826 |
| WO | WO-2026050683 | A1 | * | 3/2026 | G06F 21/55 |
| WO | WO-2026067722 | A1 | * | 4/2026 | H04W 84/06 |
| WO | WO-2026097956 | A1 | * | 5/2026 | H04W 56/00 |

OTHER PUBLICATIONS

D. Borio, L. Camoriano, L. Lo Presti and M. Fantino, "DTFT-based frequency lock loop for GNSS applications," in IEEE Transactions on Aerospace and Electronic Systems, vol. 44, No. 2, pp. 595-612, Apr. 2008, (Year: 2008).*

F. Van Graas, "Doppler Processing for Satellite Navigation," 2023 IEEE/ION Position, Location and Navigation Symposium (PLANS), Monterey, CA, USA, 2023, pp. 365-371, (Year: 2023).*

H. J. Ng, A. Fischer, R. Feger, "A DLL-Supported, Low Phase Noise Fractional-N PLL With a Wideband VCO and a Highly Linear Frequency Ramp Generator for FMCW Radars," in IEEE Transactions on Circuits and Systems I: Regular Papers, Dec. 2013 (Year: 2013).*

R. Szlosek and M. Vaezi, "An Efficient Implementation of Coarse Carrier Synchronization Utilizing Band Edge Filters," 2024 58th Annual Conference on Information Sciences and Systems (CISS), Princeton, NJ, USA, 2024, pp. 1-5, (Year: 2024).*

J. F. Kuehls and E. Geraniotis, "Presence detection of binary-phase-shift-keyed and direct-sequence spread-spectrum signals using a prefilter-delay-and-multiply device," in IEEE Journal on Selected Areas in Communications, vol. 8, No. 5, pp. 915-933, Jun. 1990, doi: 10.1109/49.56397.

Fred Harris, "Band Edge Filters : Characteristics and Performance in Carrier and Symbol Synchronization." (2010), in the 13th International Symposium on Wireless Personal Multimedia Communications.

A. N. D'Andrea, A. Ginesi and U. Mengali, "Digital carrier frequency estimation for multilevel CPM signals," Proceedings IEEE International Conference on Communications ICC '95, Seattle, WA, USA, 1995, pp. 1041-1045 vol. 2, doi: 10.1109/ICC.1995.524259.

Salwan Damman, Nazia Mozaffar, and Brendan Hill, "Signal-Agnostic Technique for Satellite Doppler Correction", 37th Annual Small Satellite Conference, Logan, UT, USA, Aug. 5-10, 2023.

Salwan Damman, Nazia Mozaffar, and Brendan Hill, "PPT Presentation on Signal-Agnostic Technique for Satellite Doppler Correction", 37th Annual Small Satellite Conference, Logan, UT, USA, Aug. 5-10, 2023.

* cited by examiner

SIGNAL-AGNOSTIC APPARATUS, SYSTEM, AND METHOD FOR DOPPLER CORRECTION

STATEMENT REGARDING FEDERALLY SPONSORED RESEARCH AND DEVELOPMENT

The United States Government has ownership rights in this invention. Licensing inquiries may be directed to Office of Research and Technical Applications Naval Information Warfare Center Pacific, Code 72120, San Diego, CA, 92152; telephone (619) 553-5118; email: NIWC Pacific T2@us.navy.mil, referencing Navy Case No. 211,611.

BACKGROUND

Typical communication relays take an incoming digital signal and shift its frequency to rebroadcast on a different channel. Users beyond line-of-sight may use this technique to communicate over a common relay. However, rebroadcast transmission can be challenging due to frequency offsets caused by the Doppler effect. The Doppler effect impacts transmissions to or from, for example, satellites in low Earth orbit due to their high velocities relative to Earth. The Doppler effect results in a frequency shift, or "offset", in the transmitted signal and may impair a station or receiver's ability to interpret the signal. A relay operable without the need to identify, demodulate, and resynthesize the signal could serve more users.

Existing strategies to correct Doppler offsets are limited to corrections within a modulation bandwidth, or require long observations that inhibit the ability to correct time varying Doppler. Moreover, existing strategies require the structure of the signal to be known ahead of time. Two correction methods include optimum band edge frequency locked loops (FLL) and prefilter delay-multiply techniques.

Optimum band edge filters measure the difference in energy between positive and negative frequency offsets for a specific signal of interest. The frequency response of optimum band edge filters is equal to the derivative of the frequency responses of the match filters for the signal of interest. Because of this design, an optimum band edge filter is only optimum for one kind of signal with one modulation type and rate at any one time. Furthermore, the derivative of the frequency response of a matched filter is limited in bandwidth. This indicates that if the incoming signal has a sufficiently high Doppler offset, the optimum band edge filters will not capture the energy from the signal, and the FLL will not correct the signal. An uncorrected signal presents a challenge in, for example, satellite applications using narrow-band signals.

Prefilter delay-multiply systems also provide a measurement of frequency offset. Existing work multiplied an incoming signal with a delayed version of itself to extract Doppler measurement. This requires advanced known of what kind of modulation is used. For example, one of the terms produced by the product of the original signal and its delayed version is a tone at twice the Doppler frequency for a BPSK signal. Similar methods are applied to QPSK and 8PSK signals where signal type is also known. This technique, however, also requires a long observation interval. As such, this technique would be more appropriate for a feed-forward system rather than a frequency-locked loop with feedback. Moreover, some have modified this method to employ an average at the output, which computes the average product of the signal and its delayed version over hundreds or more symbol periods. In this modification, the observation interval must occur over an integer number of symbol periods, or the computed Doppler frequency offset will be inappropriately biased. Because this modification computes an average over all possible symbol transitions, it requires knowledge of how many bits are used per symbol and prior knowledge of the information-bearing frequencies used in the signal. Therefore, the Doppler frequency offset is not calculable without knowing this information in advance.

Accordingly, there is a need to correct for Doppler frequency shifts without knowing the structure of the signal of interest a priori.

SUMMARY

According to illustrative embodiments, a frequency locked loop apparatus for correcting Doppler frequency offset, comprising: an amplitude normalizer configured to receive a signal from a signal input, wherein the signal has a Doppler frequency offset; a positive frequency band edge filter having a plurality of positive band edge coefficients, electrically connected to the amplitude normalizer, and operable to provide an output containing positive frequency content; a negative frequency band edge filter having a plurality of negative band edge coefficients, electrically connected to the amplitude normalizer, and operable to provide an output containing negative frequency content; a means for calculating a raw Doppler frequency offset electrically connected to the positive frequency band edge filter and the negative frequency band edge filter, wherein the calculation comprises the positive frequency content output and the negative frequency content output; a leaky integrator electrically connected to the means for calculating the raw Doppler frequency offset, and configured to average the raw Doppler frequency offset; a zero-crossing counter electrically connected to the leaky integrator, configured to increment, wherein the counter increments each time the raw Doppler frequency offset changes sign; a plurality of locking filters selectively connected to the leaky integrator and configured to refine the raw Doppler frequency offset, and wherein the plurality of locking filters are selected if the zero-crossing counter increases less often than a count update threshold; a plurality of tracking filters connected to the leaky integrator and configured to refine the raw Doppler frequency offset, and wherein the plurality of tracking filters are selected if the zero-crossing counter increments more often than the count update threshold; an array further comprising a plurality of refined Doppler offsets selectively connected to the plurality of locking filters or the plurality of tracking filters; and a numerically controlled oscillator, electrically connected to the means for storing a plurality of refined Doppler offsets and to the signal input, and configured to provide the corrective Doppler frequency offset to the signal, wherein the corrective Doppler frequency offset is determined by the plurality of refined Doppler offsets.

In one embodiment, a frequency locked loop system for correcting Doppler frequency offset, comprising: an amplitude normalizer configured to receive a signal from a signal input, wherein the signal has a Doppler frequency offset; a positive frequency band edge filter having a plurality of positive band edge coefficients, electrically connected to the amplitude normalizer, and operable to provide an output containing positive frequency content; a negative frequency band edge filter having a plurality of negative band edge coefficients, electrically connected to the amplitude normalizer, and operable to provide an output containing negative frequency content; a means for calculating a raw Doppler frequency offset electrically connected to the positive frequency band edge filter and the negative frequency band edge filter, wherein the calculation comprises the positive frequency content output and the negative frequency content output; a leaky integrator electrically connected to the means for calculating the raw Doppler frequency offset, and configured to average the raw Doppler frequency offset; a zero-crossing counter electrically connected to the leaky integrator, configured to increment, wherein the counter increments each time the raw Doppler frequency offset changes sign; a plurality of locking filters selectively connected to the leaky integrator and configured to refine the raw Doppler frequency offset, and wherein the plurality of locking filters are selected if the zero-crossing counter increases less often than a count update threshold; a plurality of tracking filters connected to the leaky integrator and configured to refine the raw Doppler frequency offset, and wherein the plurality of tracking filters are selected if the zero-crossing counter increments more often than the count update threshold; an array further comprising a plurality of refined Doppler offsets selectively connected to the plurality of locking filters or the plurality of tracking filters; anda numerically controlled oscillator, electrically connected to the means for storing a plurality of refined Doppler offsets and to the signal input, and configured to provide the corrective Doppler frequency offset to the signal, wherein the corrective Doppler frequency offset is determined by the plurality of refined Doppler offsets.

In one embodiment, a method of Doppler correction for signals, the steps comprising: determining a plurality of band edge filter coefficients for a positive band edge filter and a negative band edge filter; receiving a signal having a Doppler frequency offset; normalizing the amplitude of the signal; passing the signal into the positive band edge filter and the negative band edge filter; calculating a raw Doppler offset; averaging the raw Doppler offset; incrementing a count of a zero-crossing counter when the raw Doppler offset changes sign; refining the raw Doppler offset by locking or tracking the signal based on the counter updates, wherein if the counter increases less often than a count update threshold, locking the signal through a wide-loop proportional-integral filter, and if the counter increases more often the count update threshold, tracking the signal through a narrow-loop proportional-integral filter; storing a refined Doppler offset in an array, wherein the array comprises a plurality of refined Doppler offsets; determining an updated Doppler offset; recombing the signal with the updated Doppler offset to cancel the Doppler frequency offset; and repeating steps (d)-(l) to continuously refine the Doppler frequency offset.

It is an object to provide a Signal-Agnostic Apparatus, System, and Method for Doppler Correction that offers numerous benefits, including correcting a wide range of Doppler shifts at any signal rate up to the point where the sum of the maximum Doppler and maximum bandwidth of the signal exceeds the half sample rate of the receiver, in both phase shift keyed and frequency shift keyed signals.

It is an object to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated in and form a part of the specification, illustrate example embodiments and, together with the description, serve to explain the principles of the invention. Throughout the several views, like elements are referenced using like references. The elements in the figures are not drawn to scale and some dimensions are exaggerated for clarity. In the drawings.

DETAILED DESCRIPTION OF EMBODIMENTS

Figure 1:
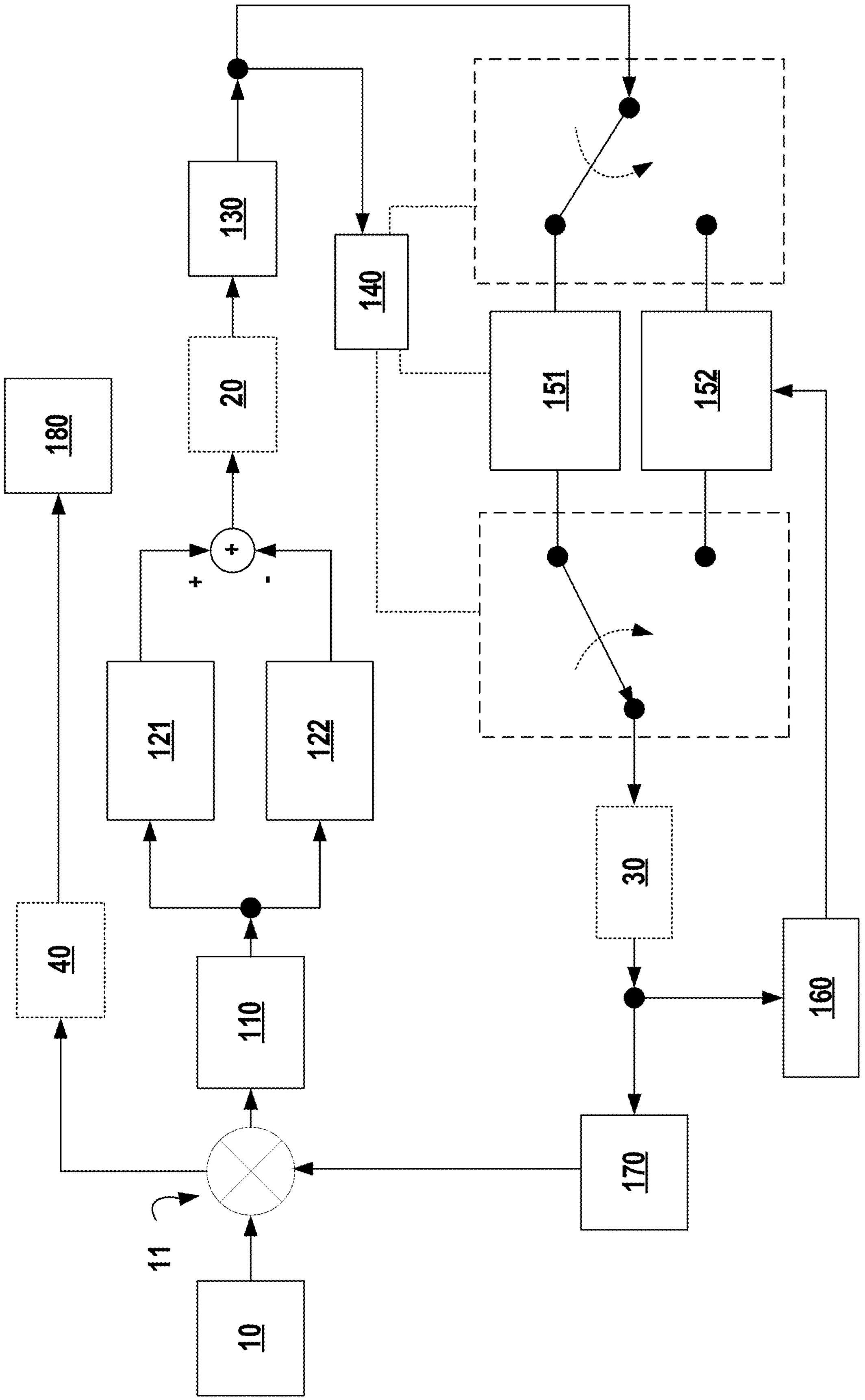
FIG. 1 shows a block diagram of a frequency locked loop for correcting Doppler frequency offset.

The disclosed apparatus, system, and method below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other apparatus, system, and method described herein as will be understood by one of ordinary skill in the art unless otherwise stated specifically.

References in the present disclosure to "one embodiment," "an embodiment," or any variation thereof, means that a particular element, feature, structure, or characteristic described in connection with the embodiments is included in at least one embodiment. The appearances of the phrases "in one embodiment," "in some embodiments," and "in other embodiments" in various places in the present disclosure are not necessarily all referring to the same embodiment or the same set of embodiments.

As used herein, the terms "comprises," "comprising," "includes," "including," "has," "having," or any variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of words such as "the," "a," or "an" are employed to describe elements and components of the embodiments herein; this is done merely for grammatical reasons and to conform to idiomatic English. This detailed description should be read to include one or at least one, and the singular also includes the plural unless it is clearly indicated otherwise.

As used herein, the terms "electrical connection," is intended to cover any electrical signal transmission technique including, but not limited to analog and digital signal processing techniques. In one embodiment, the electrical connection is a purely digital connection.

Doppler correction techniques are used in a wide array of transmission and receiver systems. The difficulty in making such corrections increases as the offsets resulting from the Doppler effect become more extreme. One illustrative embodiment of this challenge is the magnitude of the maximum Doppler offset for satellites in low earth orbit. High velocities produce offsets that could exceed the modulation bandwidth of a signal of interest. If the precise locations of a ground user and the satellite are known in advance, the expected Doppler can be cancelled out before transmission at the ground user. However, this information is not always known a priori and would not be valuable in relay applications. Relays would support beyond line-of-sight applications for a large family of signals. Accordingly, it is desirable to correct digitally modulated signals of either phase-shift keying (PSK) or frequency-shift keying (FSK) type, irrespective of the data rate and without distortion.

FIG. 1 shows a block diagram of a frequency locked loop (FLL) for correcting Doppler frequency offset, comprising a signal of interest 10, an amplitude normalizer 110, a positive frequency band filter 121, a negative frequency band filter 122, a means for calculating a raw Doppler frequency offset 20, a leaky integrator 130, a zero-crossing counter 140, a plurality of locking filters 151, a plurality of tracking filters 152, a plurality of refined Doppler frequency offsets 30, an array 160 for storing, and a numerically controlled oscillator 170. The frequency locked loop for correcting Doppler frequency offset may be used with any typical relay or receiver. In one embodiment, the frequency locked loop for correcting Doppler frequency offset may be located on a satellite, and the FLL may receive or relay a signal sourced from a ground station."

The signal of interest 10, (hereinafter "signal") may be an ultra-high frequency signal comprising a Doppler frequency offset resulting from the signal experiencing the Doppler effect during transmission. The signal 10 enters the FLL at a signal input. Furthermore, the signal 10 may comprise PSK and FSK type signals including, but not limited to, continuous phase modulated, shaped binary phase shift keyed, quadrature phase shift keyed, and binary phase shift keyed. When the incoming signal is received by the disclosed apparatus or system, the modulation type, modulation rate, and/or Doppler frequency offset may be unknown. It is desired to remove the Doppler offset from this signal before the signal is passed to either a receiver or relay repeater 180. To this end, the signal 10 may be multiplied at a multiplier block 11 by the complex conjugate of a numerically controlled oscillator (NCO) 170, which is programmable to generate a complex sinusoid at the measured Doppler frequency offset. Initially, with no measurement available, the NCO may output a 0-Hz signal. As the system or apparatus of this disclosure determines and refines the Doppler offset, the NCO output may combine with the signal to correct the Doppler offsets.

The amplitude normalizer 110 may be configured to receive a signal 10 from a signal input, wherein the signal has a Doppler frequency offset. The amplitude normalizer 110 block may ensure that the input signal amplitude for both positive and negative band edge filters is normalized. This is an important step to ensure that the signal-to-noise ratio of the input signal will not influence the averaging values, zero-crossing value and loop bandwidth values picked for this design. Additionally, the incoming signal may pass through unmodified to a CORDIC-based normalizer to achieve unity amplitude and extract the phase of the signal of interest. In one embodiment, amplitude normalizer 110 may normalize the signal according to the following equation:

$$\text{output} = e^{i*angle(input)} \tag{1}$$

The positive frequency band edge filter 121 may comprise, consist of, or consist essentially of plurality of coefficients, electrically connected to the amplitude normalizer 110, and operable to provide an output containing only positive frequency content. Similarly, the negative frequency band edge filter 122 may comprise, consist of, or consist essentially of a plurality of coefficients, electrically connected to the amplitude normalizer, and operable to provide an output containing only negative frequency content. Each band edge filter spans a bandwidth between 0 Hz and the sum of the magnitude of the maximum expected Doppler frequency and the maximum bandwidth of the signals of interest. One band edge filter encompasses positive frequencies and the other encompasses negative frequencies. The plurality of band edge filter coefficients may be derived from the orbit characteristics from the signal source and are selected to facilitate the maximum possible bandwidth. The coefficients of the band edge filters are chosen in advance not based on the characteristics of any specific signal but rather a general shape which has experimentally shown to be effective at correcting Doppler offsets in both phase shift keyed and frequency shift keyed signals. The process of determining coefficients is elaborated below and in FIG. 3 as a method determine a plurality of band edge filter coefficients.

As shown in FIG. 1, the amplitude normalizer 110 may split and provide the normalized signal to the positive 121 and negative 122 frequency band edge filters. Furthermore, the positive frequency band edge filter 121 and the negative frequency band edge filter 122 are finite impulse response (FIR) filters and use generated band edge filter coefficients.

In one embodiment, both the positive 121 and negative 122 filters use the same input. This disclosure may function on both phase shift keyed and frequency shift keyed signals and can respond to any symbol rate or Doppler frequency offset up to the bandwidth of the band edge filters. Finally, the positive 121 and negative 122 band edge further comprise a positive frequency content filter output and a negative frequency content filter output, respectively.

Figure 4A:
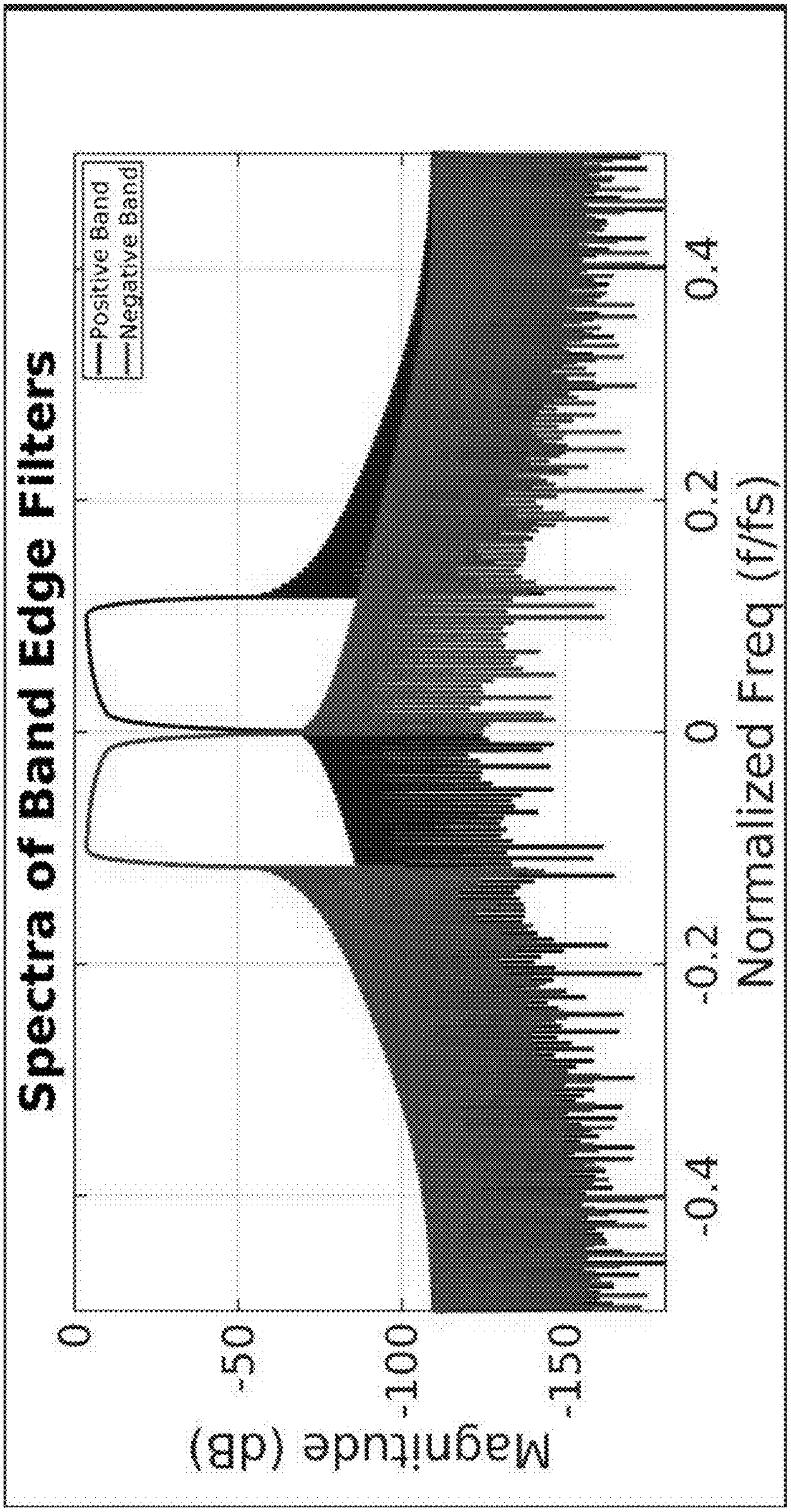
FIG. 4A is a spectrum plot of one embodiment of positive and negative band edge filters that are used to correct for the Doppler offset.

The means for calculating a raw Doppler frequency offset 20 may be electrically connected to the positive 121 and negative 122 frequency band edge filters, wherein the calculation may comprise, consist of, or consist essentially of plurality of the positive frequency content filter output and the negative frequency content filter output. The output of the positive band edge filter 121 contains content occupying frequencies above the center of the channel of interest. Similarly, the output of the negative band edge filter 122 contains content occupying frequencies below the center of the channel of interest. As shown in FIG. 4A, these signals may be represented in a baseband where the center of the channel of interest has been down converted to zero hertz. In this representation, the output of the positive band edge filter 121 occupies positive frequencies, and the output of the negative band edge filter 122 occupies negative frequencies. Both outputs are represented with complex numbers. To extract the raw Doppler offset 20 from the two filter outputs, the energy difference between the positive and negative band edge filter outputs is calculated. An efficient way to perform this operation is to multiply the sum of the band edge filter outputs by the complex conjugate of the difference of the band edge filter outputs, and then take the real part of the result. Thereafter, the raw Doppler frequency offset 20 may be fed forward to a leaky integrator 130.

The leaky integrator 130 may be electrically connected to the means for calculating the raw Doppler frequency offset 20 and configured to average the raw Doppler frequency offset 20 over an interval. The leaky integrator 130 may be used to reduce noise variance and to put more emphasis on the latest raw offset measurements. The output of the leaky integrator 130 is an averaged raw Doppler offset, which is an estimation of the Doppler offset based on the band edge filters' outputs. Calculating the averaged raw Doppler offset may be performed by the following equation, for example:

$$\text{output} = (1 - \text{alpha}) * \text{output\_previous} + (\text{alpha}) * \text{input} \quad (3)$$

In this equation the "output" is the average raw Doppler offset, "alpha" is a tunable value in the leaky integrator 130, the "output_previous" is the previously determined average raw Doppler, and "input" is the latest raw Doppler offset. Alpha is tunable from a value of 0 to 1, where a smaller alpha value suggests a more aggressive averaging operation. The output of the leaky integrator 130 may be fed to a zero-crossing counter 140 and to the plurality of locking filters 151 or tracking filters 152.

The zero-crossing counter 140 monitors the averaged raw Doppler offset for sign changes. As discussed previously, there is an alpha value associated with the averaged raw Doppler offset that determines the aggressiveness of the averaging operation. The aggressiveness mentioned here manifests in the amount of zero-crossing occurring. More aggressive averaging results in more latency and less zero-crossings. An operator will tune the alpha value to the needs of the system, optimizing it to quickly lock the raw offset and then continuously track the offset over time.

The zero-crossing counter 140 may be electrically connected to the leaky integrator, and is configured to increment, wherein the counter increments each time the raw Doppler frequency offset changes sign and comprises a count update threshold. The zero-crossing counter 140 keeps track of the current and previous averaged Doppler frequency offset measurement values 20. If the signal has high residual Doppler offset, then this value will not change signs often. If, however, the signal has been corrected to have its Doppler removed, then there will be frequent sign changes as this value crosses zero. The frequency of sign changes is identified by the increments of the zero-crossing counter 140 as an incrementing count. If the previous value was positive and the current value is negative, then the counter increments. If the previous value was negative and the current value is positive, then the counter also increments.

Furthermore, the zero-crossing counter 140 controls if the signal is passed through the plurality of locking filters 151 or the plurality of tracking filters 152 by comparing the frequency of counter increases to a count update threshold. The count update threshold is selected and/tuned by an operator and based on the plurality of locking filters 151 and plurality of tracking filters 152. If the counter increases less often than a count update threshold, locking the signal is passed through a plurality of locking filters 151, and if the counter increases more often than a count update threshold, tracking the signal is passed through the plurality of tracking filters. Accordingly, when the FLL switches from locking mode to tracking mode, the counter will reset. In some instances, if the FLL is in tracking mode and the averaged Doppler frequency offset measurement value 20 has not crossed the zero line after a specific number of samples, the FLL may assume that it lost the signal, and it can default back to the locking mode.

As shown in FIG. 1, the FLL for correcting Doppler frequency offset comprises a plurality of locking filters 151 and a plurality of tracking filters 152, which may be alternatively selected in the loop (as shown by dashed lines surrounding the switch, to the right of blocks 151 and 152). The selection is based on the zero-crossing counter, as detailed above, where the wide-bandwidth PI loop filter 152 is associated with a locking mode and the narrow-bandwidth PI loop filter is associated with the tracking mode. When the zero-crossing 140 count is more than a count update threshold, the locking mode switches to the tracking mode to reduce the noise present in the loop when the Doppler is close to being fully corrected. The count update threshold is selected and tunable by the user depending on the incoming signal and desired convergence conditions.

The plurality of locking filters 151 are configured to refine the raw Doppler frequency offset 20 and may be selectively connected to the leaky integrator 130. The plurality of locking filters is selected based on the zero-crossing count relative to the count update threshold. Said selecting the plurality of locking filters 151 will narrow the signal of interest towards a suitable bandwidth for a tracking filter. The locking and tracking filters work in conjunction to lock onto the signal. Furthermore, the plurality of locking filters comprises wide-bandwidth PI loop filters having differing widths. Each width value is preselected at a value large enough to allow the locking mode to lock as fast as possible, but not too large to avoid large oscillations and an unstable PI filter. The predetermined value be based on averaged raw estimates, based on simulating signals of interest, and adding beyond worst case channel imperfections (e.g. high Doppler offset, high rate of change of Doppler, low SNR and such). Wider loop bandwidth may allow the loop to converge on the Doppler frequency more quickly, but the wider loop bandwidth may also allow more noise into the system. Furthermore, each of the plurality of locking filters 151 are selectable as determined by the zero-crossing counter's value as compared to a count update threshold.

The plurality of tracking filters 152 may be selectively connected to the leaky integrator 130 and configured to refine the raw Doppler frequency offset 20. The plurality of tracking filters 152 comprise narrow-bandwidth PI filters where he narrowness of the tracking mode's bandwidth is narrow enough to not respond to the modulation of the signal itself, but not too narrow so it can manage the residual time-varying Doppler 30 in a locked state. As described above, the plurality of tracking filters 152 is selected if the zero-crossing counter 140 has a count greater than the count update threshold. The averaged Doppler offset measurement 20 will continue to have sign changes while the signal of interest is still in lock. However, it signifies the loss of lock for the signal of interest if the zero-crossing counter fails to increment for a prolonged duration. In that case, the FLL may switch back to the locking mode to attempt to lock again. Additionally, the FLL will switch back to the lock mode when the FLL had not been receiving a signal for a period and then the signal of interest reappears.

The plurality to locking filters 151 and the plurality of tracking filters 152 work in combination to continuously correct the Doppler shift in the signal of interest using wide and narrow loop bandwidths. In one embodiment, the plurality of locking filters 151 may comprise one wide-bandwidth PI filter and the plurality of tracking filters 152 may comprise one narrow-bandwidth PI filter. However, embodiments with multiple locking and/or tracking filters also present benefits. Combinations of different filter widths for multiple locking and tracking filters may enhance locking and tracking for different signals of interest. In one embodiment, the plurality of locking filters 151 may comprise one wide-bandwidth filter and the plurality of tracking filters 152 may comprise three narrow-bandwidth filters each having different narrowness. In this embodiment, a zero-crossing counter can be used to determine which narrow-bandwidth loop to switch to after locking the signal with the wide-bandwidth filter. This embodiment has the benefit of different tracking options for different signals/use cases.

Alternatively, another implementation may comprise the plurality of locking filters having a first wide-bandwidth and subsequent intermediate nodes between the locking and tracking modes. The intermediate nodes are PI filters with narrower and narrower loop bandwidths until the signal switches to the tracking mode. This embodiment can leverage successive narrowing towards a plurality of tracking filters 152.

Alternatively, another implementation may include two different locking modes comprising wide-bandwidth PI filters where a locking-mode selection logic dictates which mode to use at the very beginning. In this embodiment, the FLL may then switch to either of two associated tracking modes that use different loop bandwidths.

In another embodiment, the plurality of locking filters 151 and plurality of tracking filters 152 may comprise PI filters with dynamic, continuously adjusting bandwidths in response to instantaneous measurements of frequency error or the number of zero crossings counted. This may have the effect of replacing the selection of two possible proportional integral filters with a selection of many possible PI filters, each with a different loop bandwidth.

There are significant advantages with the using a plurality of locking and tracking PI filters when there is a severe Doppler offset. The use of a wide loop bandwidth allows for a rapid Doppler correction and the use of narrow loop bandwidth allows for the correction of the residual Doppler offset while reducing the amount of noise in the offset measurements. This results in a faster Doppler correction compared to, for example, optimum band edge filters and pre-filter techniques.

After the signal 10 passes through either of the PI loop filters, the refined Doppler offset 30 may be stored in an array 160 having "N" values. Each "N" value may be one of a plurality of refined Doppler offsets. The array 160 comprises, consists of, or consisting essentially of a plurality of refined Doppler offsets 30 and may be selectively connected to the plurality of locking filters 151 or the plurality of tracking filters 152. As shown in FIG. 1 the dash-line boxes highlight that the selectivity of the loop enables the plurality of locking filters 151 or the plurality of tracking filters 152 to be selected. In one embodiment, an "N" refined Doppler frequency offset is saved to the array. Furthermore, "N" number of values may be equal to the amount of zero crossings that are needed to switch to the plurality of tracking filters. Furthermore, the array 160 may further comprise a median value or mean value of the array. In one embodiment, the median or mean value of the array 160 may be fed to the narrow-bandwidth PI loop to set the width of the narrow-bandwidth. When the FLL switches to the plurality of tracking filters, the median value of that array 160 may be used for the initialize the integrator accumulator component of the Narrow-Bandwidth Proportional-Integral filter 152. After that, the array 160 may be reset and filled up again when the FLL is in the plurality of locking filters.

The numerically controlled oscillator 170 is electrically connected to array 160 and to the signal input 10 at the multiplier block 11, and configured to provide the corrective Doppler frequency offset to the signal, wherein the corrective Doppler frequency offset is determined by the plurality of refined Doppler offsets. The output of the selected PI filter is a refined Doppler frequency offset measurement which can be passed as an input to the numerically controlled oscillator 170 to compute a tone with the negative of the measured frequency. The NCO may receive the latest refined Doppler offset value or median value ("input") and may use it to cancel out the Doppler offset in the received signal by using the following equation:

$$\text{output} = e^{-i*input}$$

When the system is locked to the Doppler offset of the incoming signal, the product of the NCO and the incoming signal 10 will be a version of the incoming signal with the Doppler frequency offset corrected. In some embodiments, this corrected offset may be further refined. In other embodiments, one version of the Doppler-free digitally modulated signal of interest 40 may be passed to a receiver or to a relay 180 without the need of further signal processing to compensate for the frequency offset.

Figure 2:
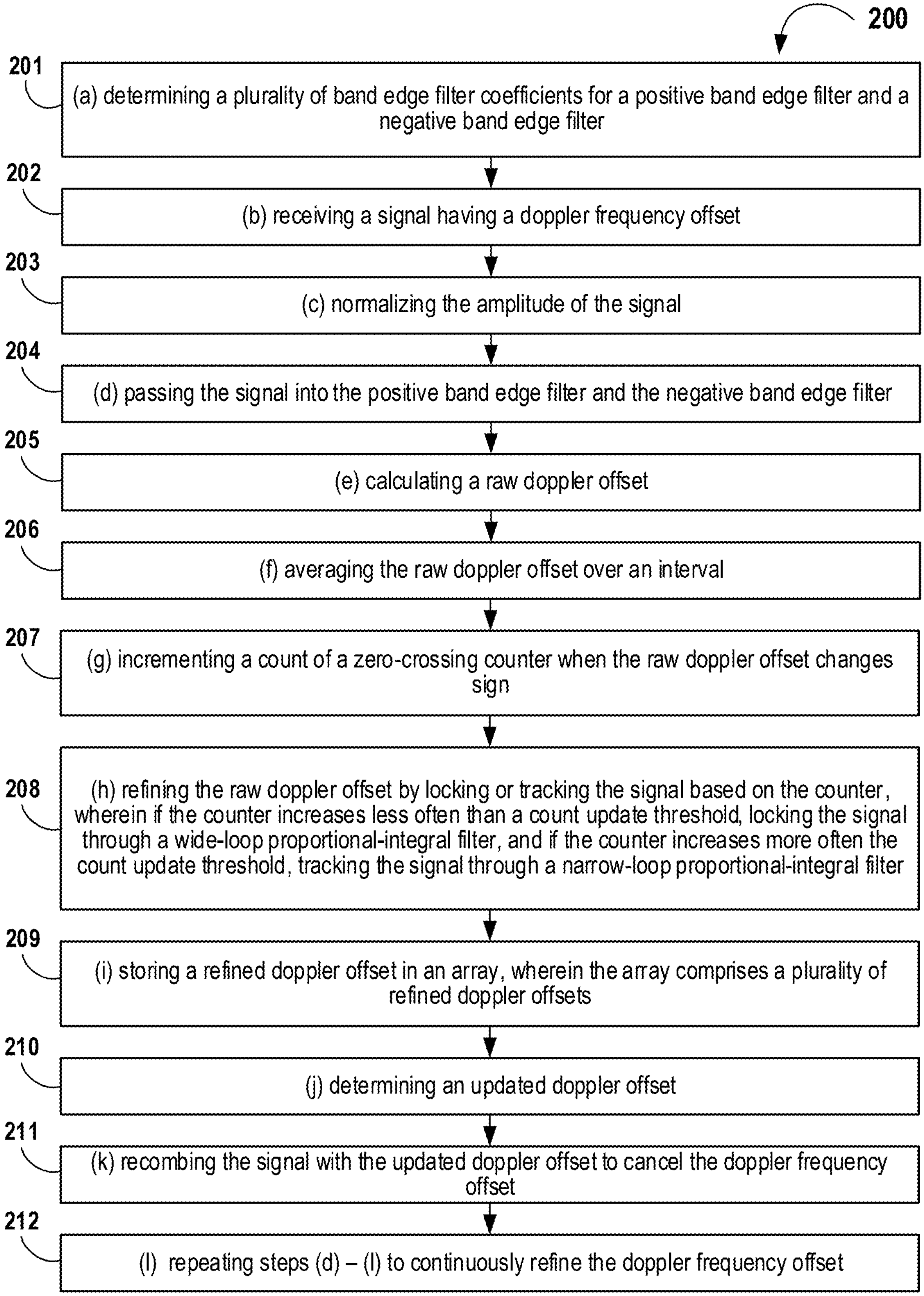
FIG. 2 is a block diagram illustration of a method of Doppler correction for signals.

FIG. 2 is a block diagram illustration of a method of Doppler correction for signals 200, comprising: determining a plurality of band edge filter coefficients for a positive band edge filter and a negative band edge filter 201; receiving a signal having a Doppler frequency offset 202; normalizing the amplitude of the signal 203; passing the signal into the positive band edge filter and the negative band edge filter 204; calculating a raw Doppler offset 205; averaging the raw Doppler offset over an interval 206; incrementing a count of a zero-crossing counter when the raw Doppler offset changes sign 207; refining the raw Doppler offset by locking or tracking the signal based on the rate of the counter increments, wherein if the counter increases less often than a count update threshold, locking the signal through a wide-loop proportional-integral filter, and if the counter increases more often the count update threshold, tracking the signal through a narrow-loop proportional-integral filter; tracking the signal through a narrow-loop proportional-integral filter 208; storing a refined Doppler offset in an array, wherein the array comprises a plurality of refined Doppler offsets 209; determining an updated Doppler offset 210; mixing the signal with the updated Doppler offset 211 cancel the Doppler frequency offset; and repeating steps (d)-(l) to continuously refine the Doppler frequency offset 212.

The first step in this method 200 is to create the positive and negative band edge filter coefficients. The bandwidth of these filters is dependent on the bandwidths of the signals of interest and the maximum amount of Doppler expected. The band edge filter coefficients may be chosen to be responsive to both frequency and phase shift keyed signals. In one embodiment, orbit characteristics of the satellite may be used to determine the maximum and minimum expected observed Doppler frequency offset. This information may then be used to select a bandwidth of a low pass filter. The time series of this low pass filter prototype may then be multiplied by a window function to reduce ripple observed in the frequency domain. These coefficients may then be copied and frequency shifted to the positive and negative maximum expected Doppler frequency. At this step, there are two band edge filters.

Additionally, it may be desirable to apply a frequency selective response that emphasizes higher magnitude Doppler offsets over lower Doppler offsets. In such a case, a ramp function may be defined in the frequency domain. Next, an inverse Fourier transform may be used to convert this frequency domain ramp into a time-domain series. The length of this time series may then be truncated to limit the computational complexity of the system. This truncated time series of the frequency domain ramp function may be multiplied by a window function to eliminate ripple caused by the truncation operation. Thereafter, the result of the truncated time series multiplied by the window function may be convolved with the coefficients shifted to the positive and negative maximum expected Doppler frequency. Finally, this results in the positive and negative band edge filter coefficients.

After the plurality of band edge filter coefficients are determined, the next step is to load the positive frequency band edge filter coefficients into the Positive Frequency Band Edge Filter 121 and the negative frequency band edge filter coefficients into the Negative Frequency Band Edge Filter 122.

Figure 3:
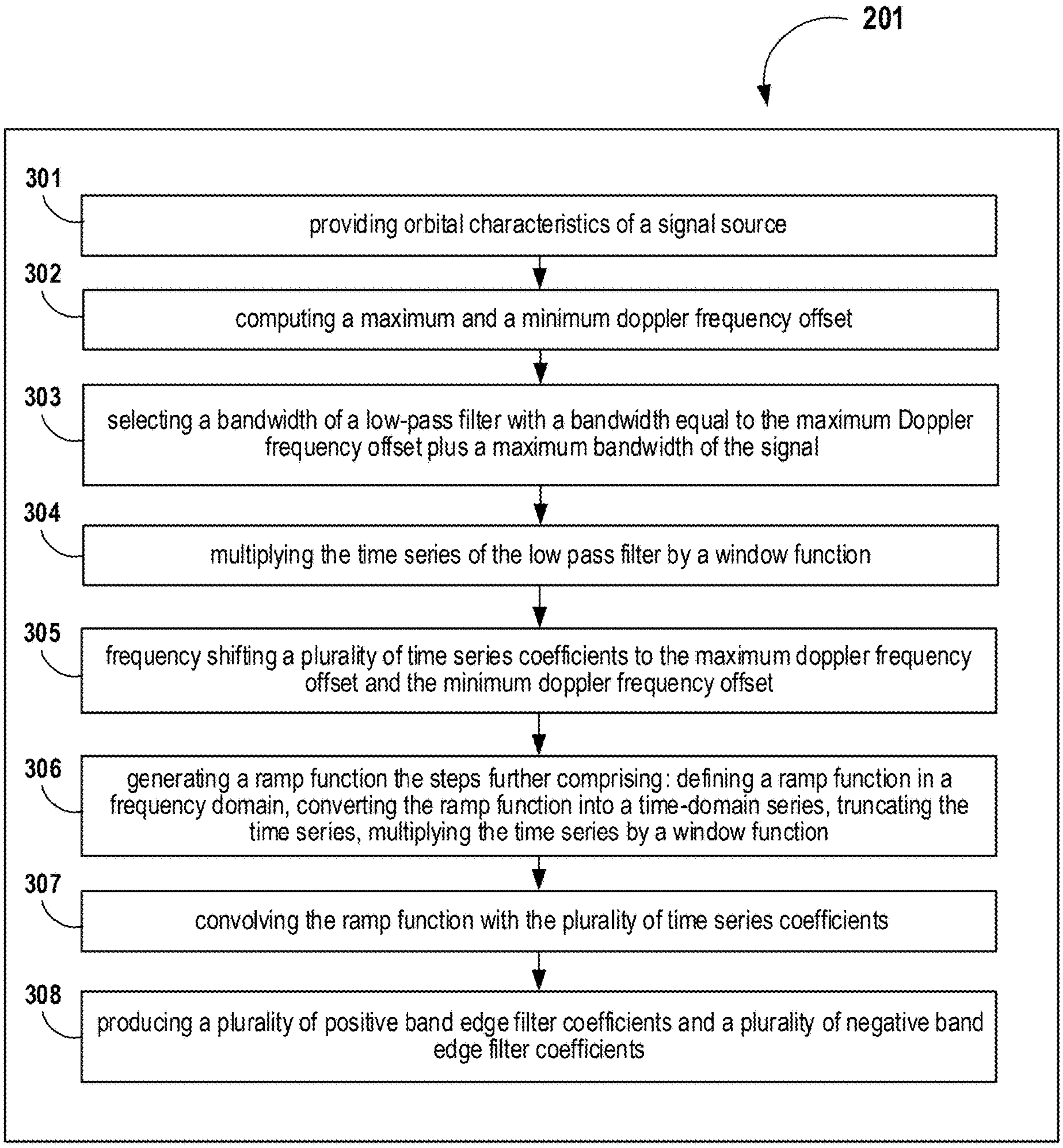
FIG. 3 is a block diagram illustration of determining a plurality of band edge filter coefficients for a positive band edge filter and a negative band edge filter.

FIG. 3 is a block diagram illustration of determining a plurality of band edge filter coefficients for a positive band edge filter and a negative band edge filter 201, further comprising: providing orbital characteristics of a signal source 301; computing a maximum and a minimum Doppler frequency offset 302; selecting a bandwidth of a low-pass filter with a bandwidth equal to the maximum Doppler frequency offset plus the maximum bandwidth of the signals of interest 303; multiplying the time series of the low pass filter by a window function 304; frequency shifting a plurality of time series coefficients to the maximum Doppler frequency offset and the minimum Doppler frequency offset 305; generating a ramp function the steps further comprising: defining a ramp function in a frequency domain, converting the ramp function into a time-domain series, truncating the time series, multiplying the time series by a window function 306; convolving the ramp function with the plurality of time series coefficients 307; and producing a plurality of positive band edge filter coefficients and a plurality of negative band edge filter coefficients 308.

FIGS. 4A, 4B, 4C, 4D, 4E, 4F, and 4G demonstrate embodiments of this disclosure where different signals of interest were simulated and analyzed in MATLAB. A variety of signals of interest were generated along with channel imperfections added to test the disclosed subject matter. The channel imperfections include additive white Gaussian noise and time-varying Doppler frequency offset with an initial offset of 8 kHz and a rate of change of Doppler of −75 Hz/sec. The parameters were chosen to represent beyond worst-case conditions for a 300 MHz carrier signal received on a low-earth-orbit satellite orbiting at an altitude of 500 miles from a ground station. The following figures demonstrate the invention's ability to correct for the time-varying frequency offset for signals of different modulation rates and modulation types. All of the signals tested have a signal-to-noise ratio of 9 decibels (dB). Again, these demonstrate embodiments of the subject matter discussed herein and are not so limited.

Figure 4B:
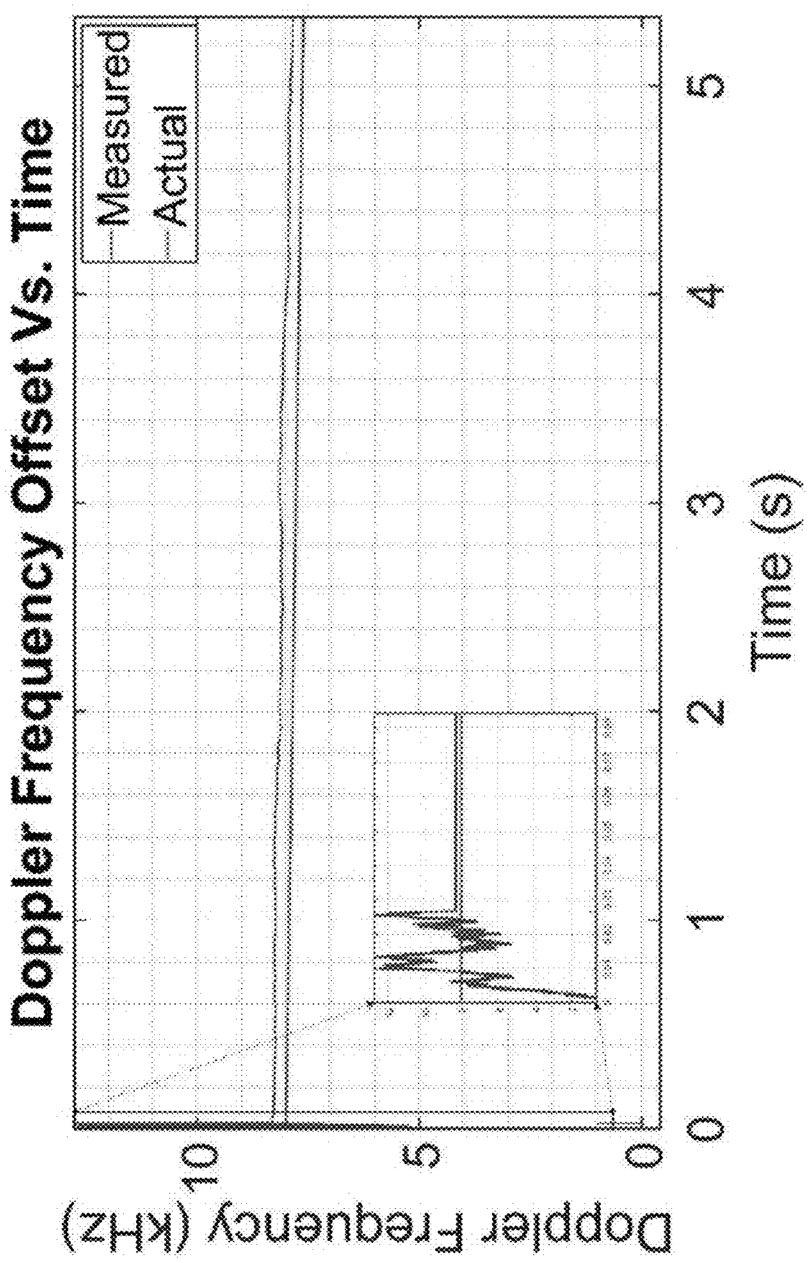
FIG. 4B show the performance of one embodiments of this disclosure on CPM signals with modulation rate of 9.6 kHz.
Figure 4C:
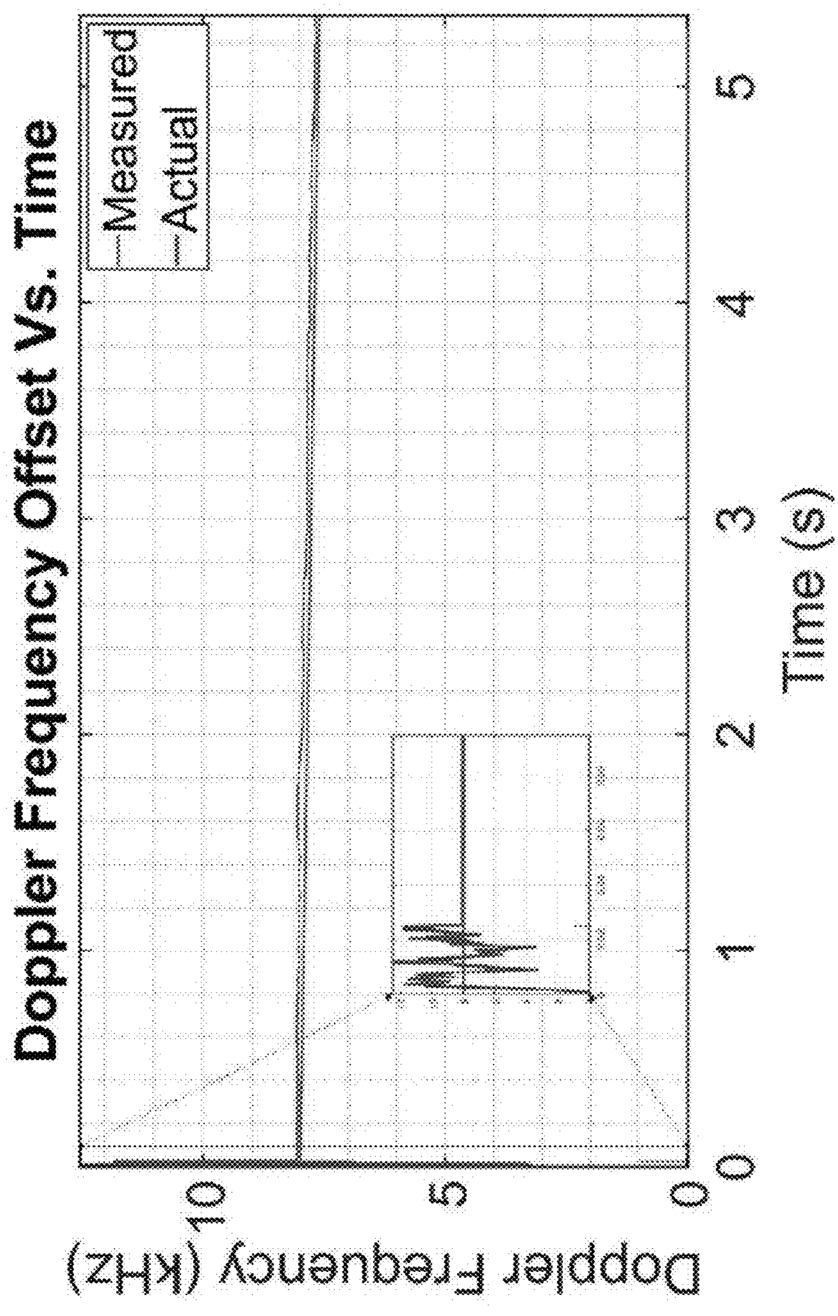
FIG. 4C show the performance of one embodiments of this disclosure on CPM signals with modulation rate of 19.2 kHz.
Figure 4D:
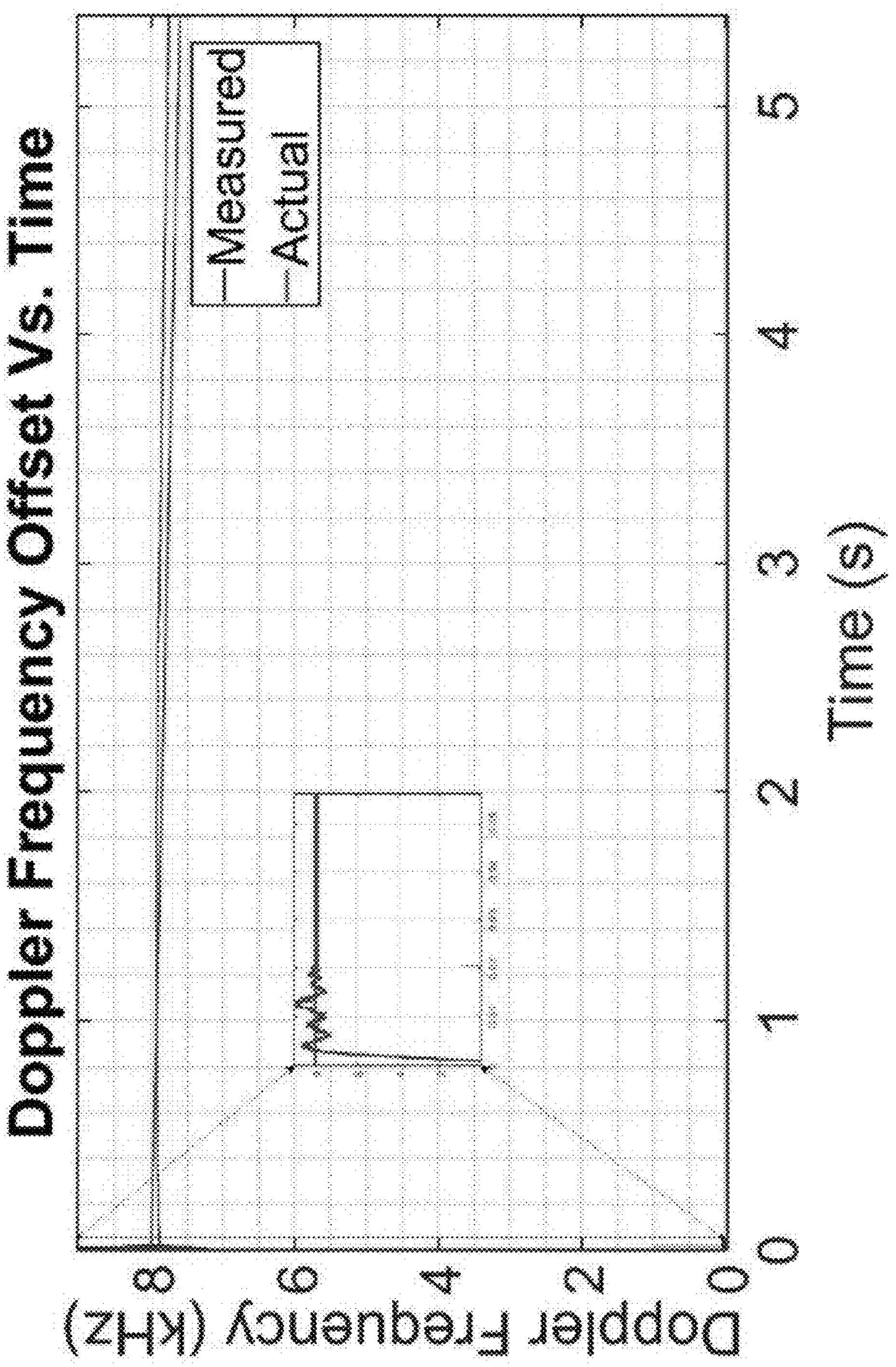
FIG. 4D show the performance of one embodiments of this disclosure on shaped binary phase shift keyed signals with modulation rate of 9.6 kHz.
Figure 4E:
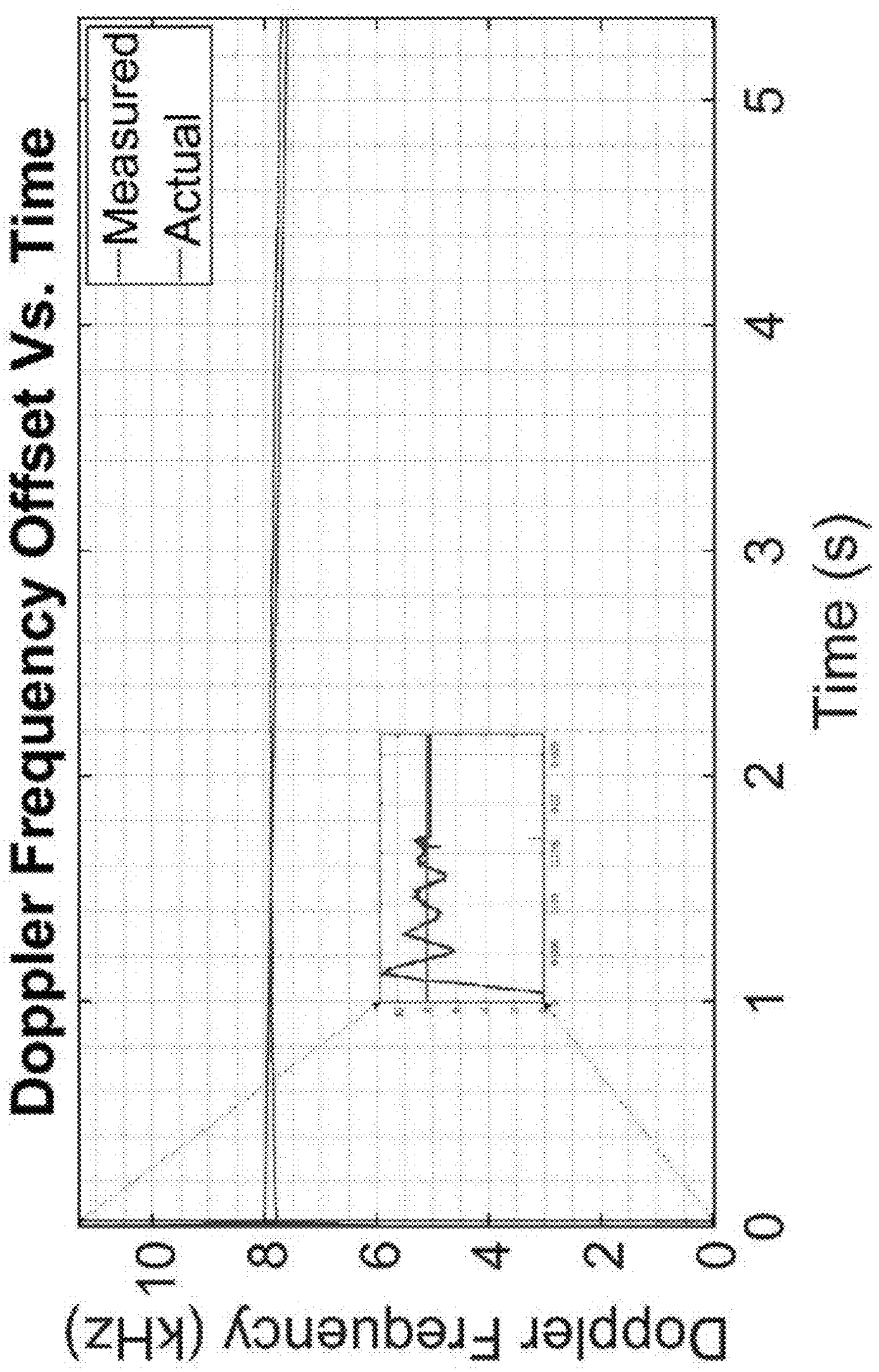
FIG. 4E show the performance of one embodiments of this disclosure on shaped binary phase shift keyed signals with modulation rate of 19.2 kHz.
Figure 4F:
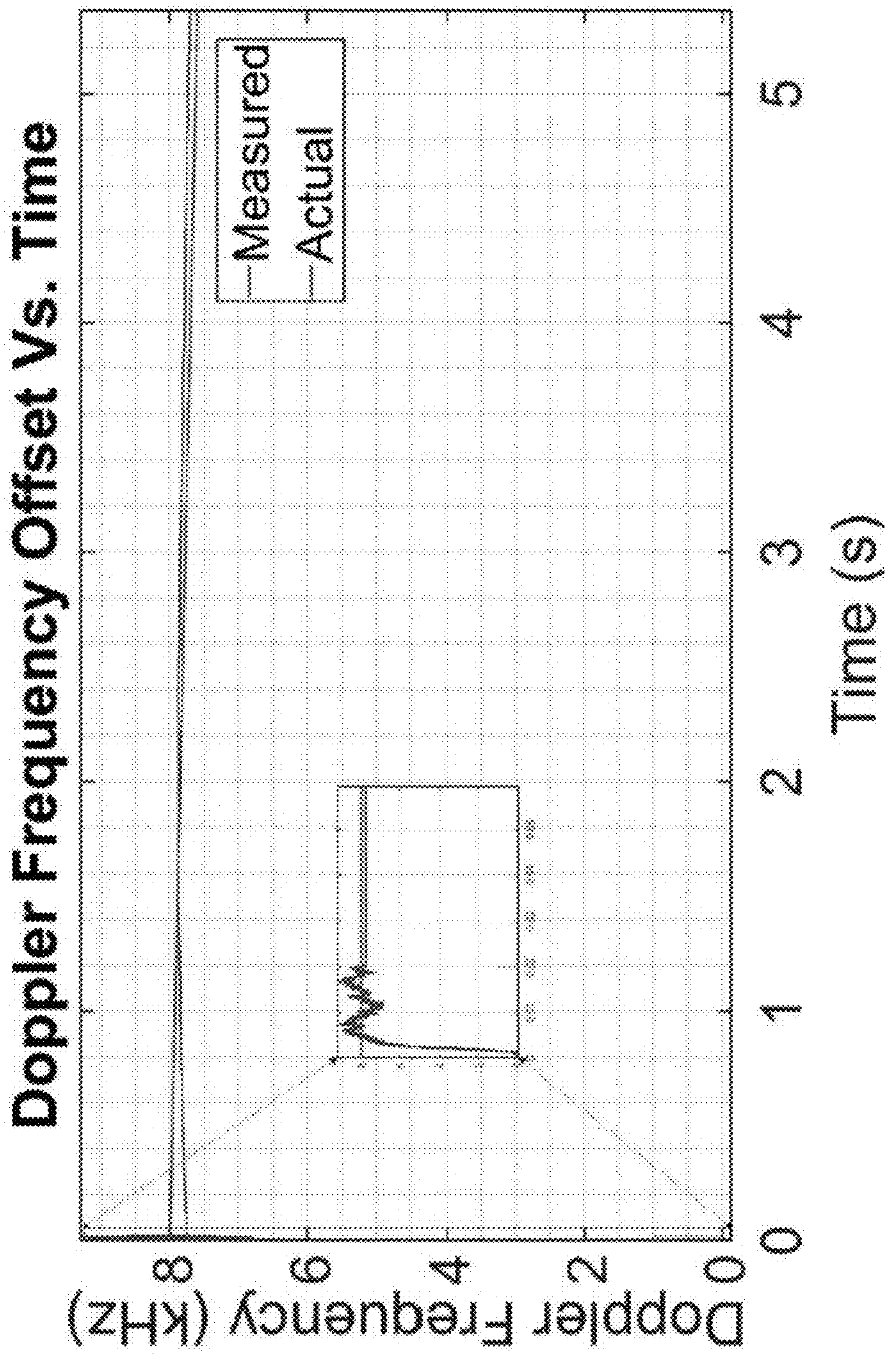
FIG. 4F show the performance of one embodiments of this disclosure on binary phase shift keyed signals with modulation rate of 9.6 kHz.
Figure 4G:
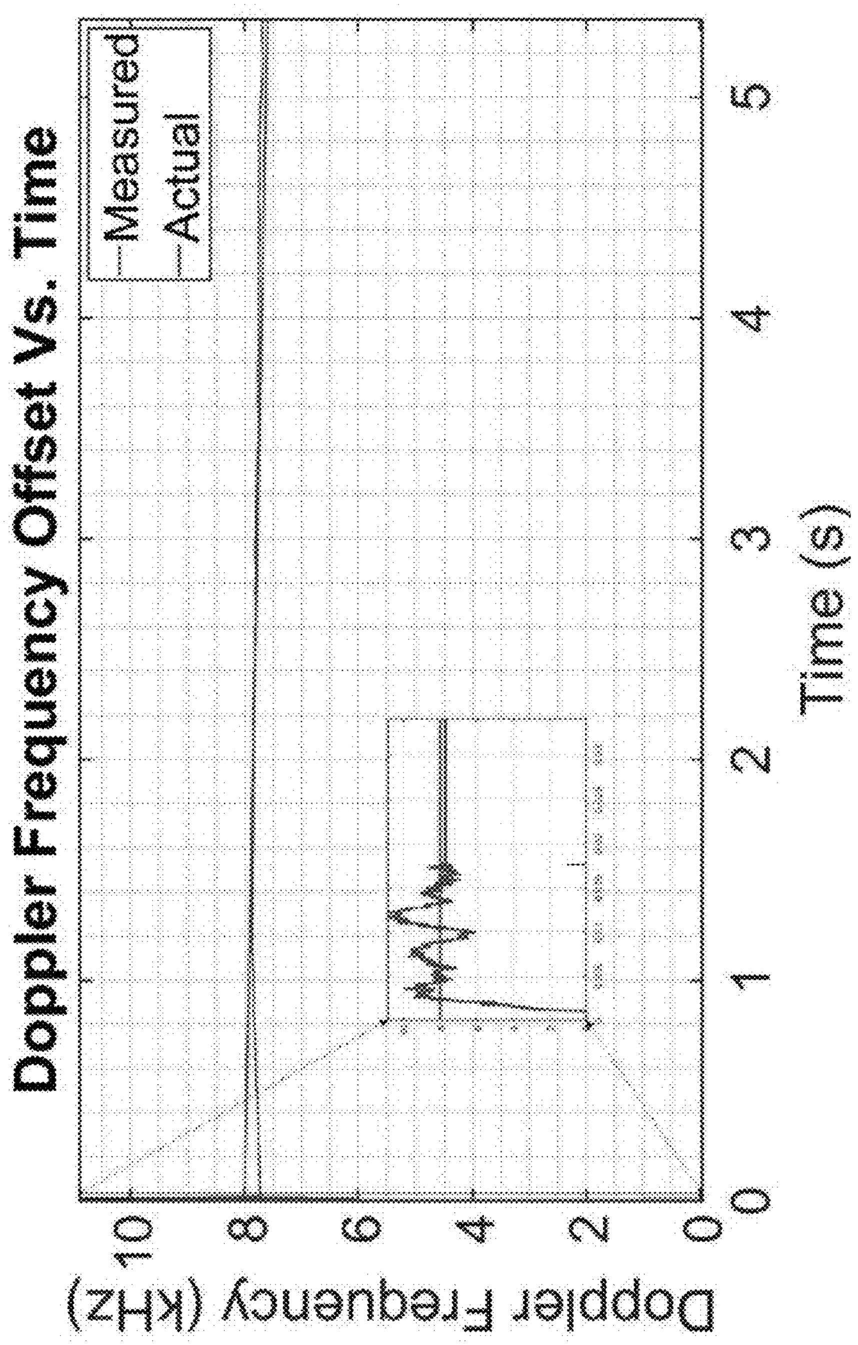
FIG. 4G show the performance of one embodiments of this disclosure on binary phase shift keyed signals with modulation rate of 19.2 kHz.

FIG. 4A is a spectrum plot of one embodiment of positive 121 and negative 122 band edge filters that are used to correct for the Doppler offset. FIGS. 4B and 4C show the performance of the two embodiments of this disclosure on continuous phase modulated (CPM) signals with modulation rates of 9.6 kHz and 19.2 kHz, respectively. FIG. 4D and FIG. 4E show the performance of two embodiments of this disclosure on shaped binary phase shift keyed (SBPSK) signals with modulation rates of 9.6 kHz and 19.2 kHz, respectively. Finally, FIGS. 4F and 4G show the performance of the two embodiments of this disclosure on binary phase shift keyed (BPSK) signals with modulation rates of 9.6 kHz and 19.2 kHz, respectively. The blue plots in the figures represent the refined Doppler frequency estimate that the invention calculated, and the red lines represent the actual Doppler offset profile that was applied to the signals. These figures demonstrate embodiments of the subject matter discussed herein and are not so limited.

Figure 4H:
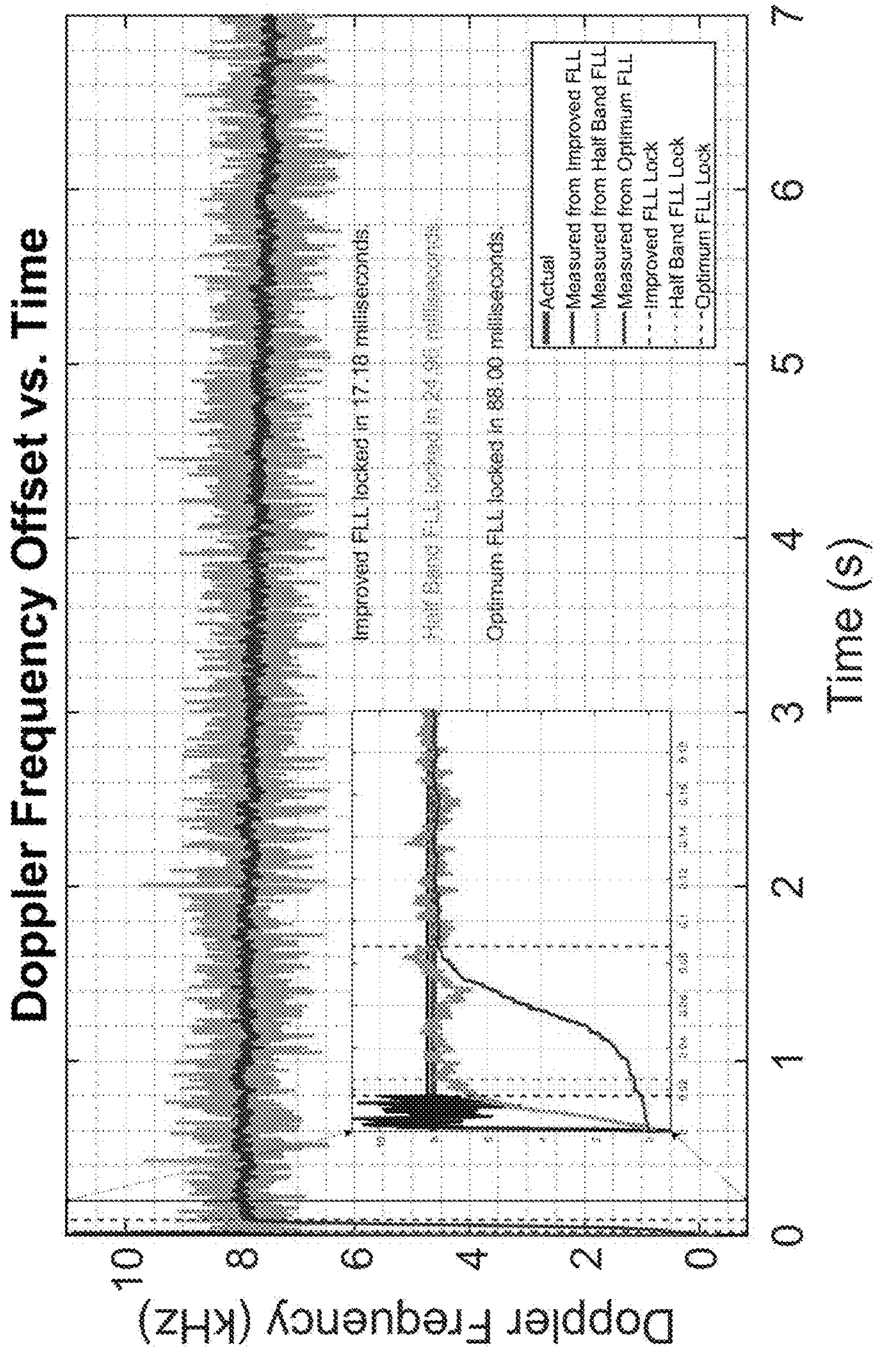
FIG. 4H shows an exemplary spectrum plot comparing the Signal-Agnostic Apparatus, System, and Method for Doppler Correction described herein (shown in FIG. 4H as "Improved FLL"); a half-band FLL; and an optimum FLL under a first set of conditions.

FIG. 4H shows an exemplary spectrum plot comparing the Signal-Agnostic Apparatus, System, and Method for Doppler Correction described herein (shown in FIG. 4H as "Improved FLL"); a half-band FLL; and an optimum FLL. This plot may be produced by generating a 5 kHz BPSK signal with a signal-to-noise ratio of 10 dB, and adding a time-varying Doppler offset with an initial offset of 8 kHz and −75 Hz/sec rate of change of Doppler. Then, this frequency-shifted signal may be fed into the Signal-Agnostic Apparatus, System, and Method for Doppler Correction described herein; a half-band FLL; and an optimum. The half-band FLL is like the optimum band-edge FLL. However, it uses a positive frequency band-edge filter that covers all the positive frequencies and a negative frequency band-edge filter that cover all the negative frequencies within the operating sample rate. As shown in FIG. 4H, both the Improved FLL and the half-band FLL lock much faster than the optimum band-edge FLL. Additionally, both the improved FLL and the optimum band-edge FLL have a lower standard deviation error than the half-band FLL. The standard deviation error may be identified by looking the magnitude of the fluctuations of frequency estimates fluctuate around the actual frequency offset. The Signal-Agnostic Apparatus, System, and Method for Doppler Correction overall outperforms both methods since it locks rapidly, and it has the lowest standard deviation error due to the narrow bandwidths used for the tracking mode.

Figure 4I:
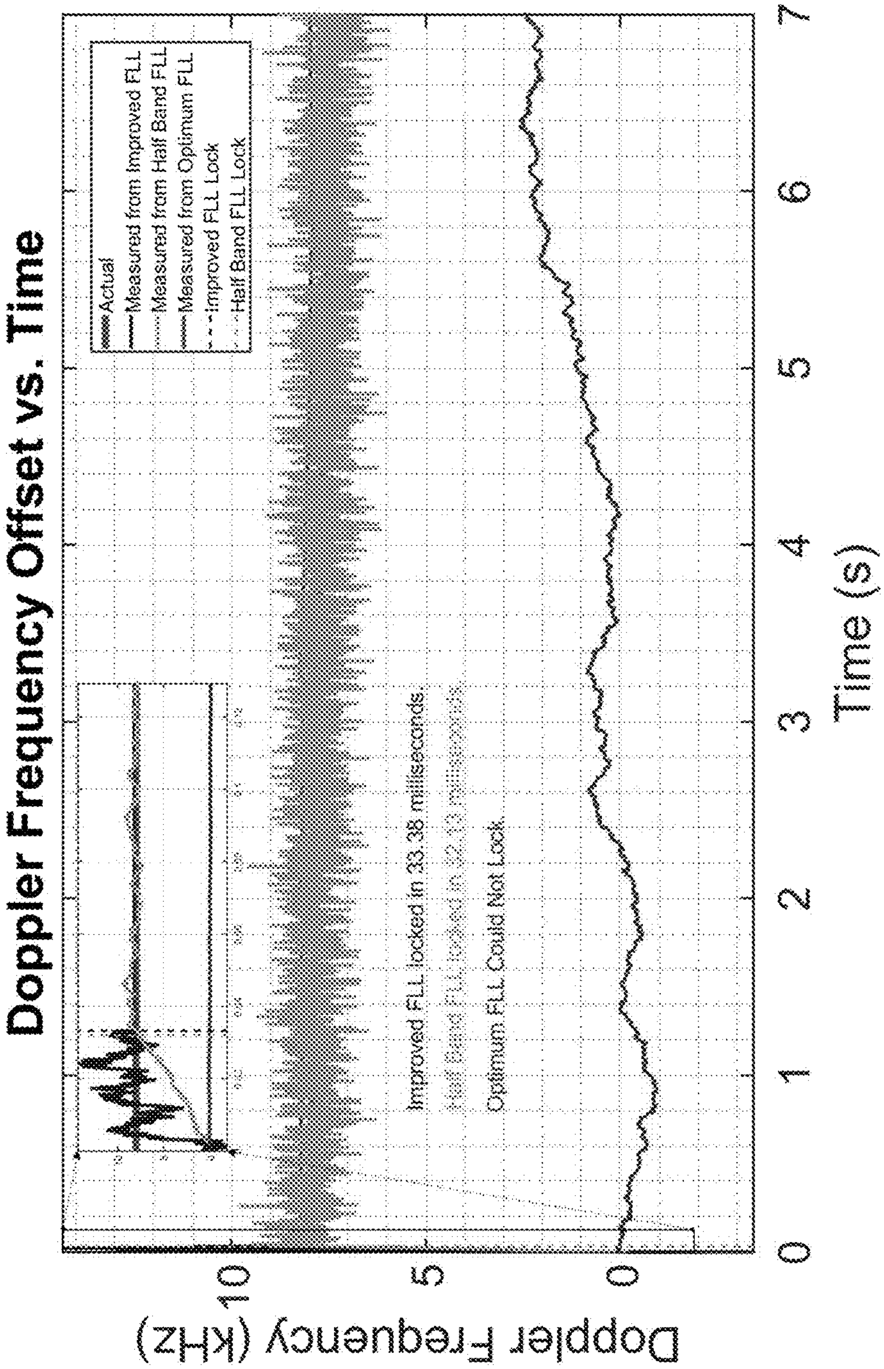
FIG. 4I shows an exemplary spectrum plot comparing the Signal-Agnostic Apparatus, System, and Method for Doppler Correction described herein (shown in FIG. 4H as "Improved FLL"); a half-band FLL; and an optimum FLL under a second set of conditions.

FIG. 4I shows a similar comparison to FIG. 4H of an exemplary spectrum plot comparing the Signal-Agnostic Apparatus, System, and Method for Doppler Correction described herein (shown in FIG. 4H as "Improved FLL"); a half-band FLL; and an optimum FLL. In this case, a 2.5 kHz BPSK signal may be used and the Doppler offset of 8 kHz may be larger than twice the modulation rate of 2.5 kHz. As mentioned previously, the optimum band-edge FLL fails when the frequency offset is significantly larger than the modulation rate and, therefore, cannot lock. The Improved FLL and the half-band FLL may both lock the signal, but the Improved FLL has a significantly lower standard deviation error. High standard deviation error implies that the FLL is introducing frequency fluctuations into the signal of interest that results in signal corruption, especially for CPM signals. Accordingly, the half-band FLL and Optimum FLL cannot adequately perform in these exemplary conditions.

Figure 5A:
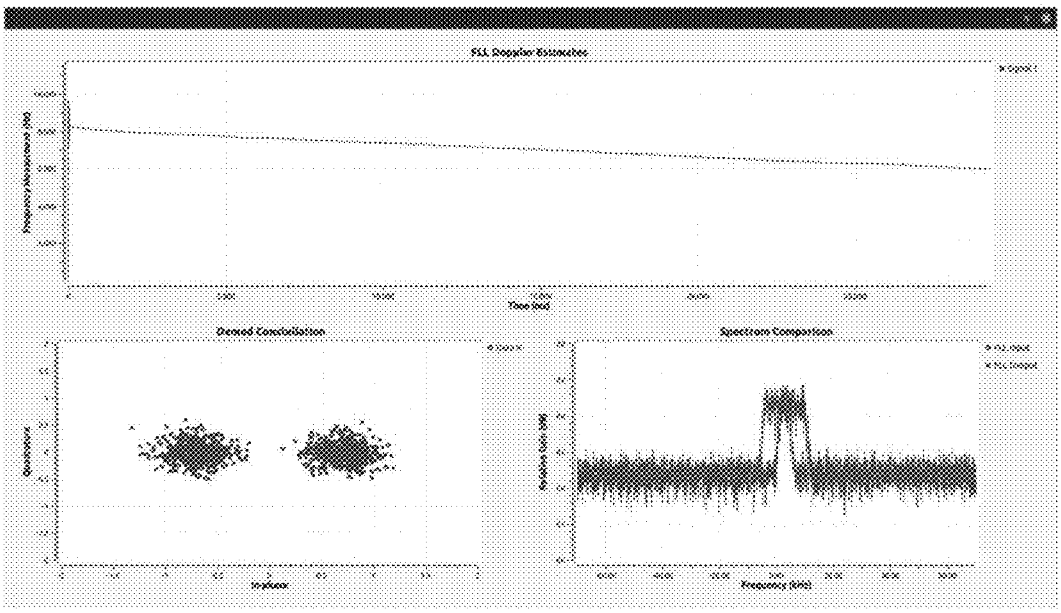
FIG. 5A shows a plot demonstrating the performance of one embodiment with 9.6 kHz binary phase shift keyed signal.
Figure 5B:
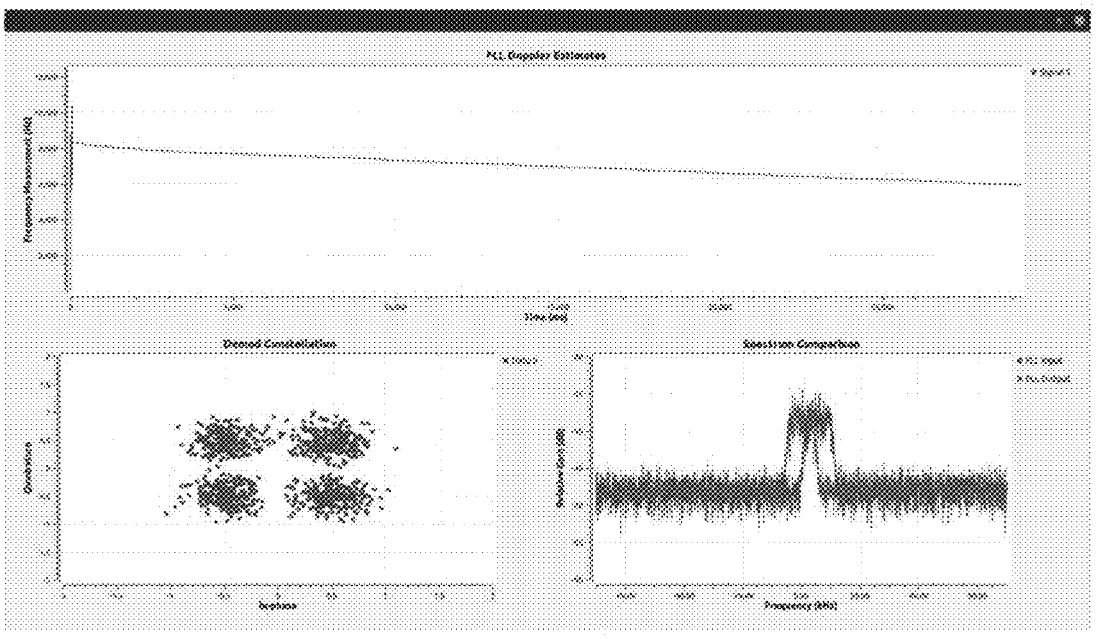
FIG. 5B show plots demonstrating the performance of one embodiment with a 9.6 kHz quadrature phase shift keyed signal.

FIGS. 5A and 5B contain plots to show the performance of two embodiments with 9.6 kHz binary phase shift keyed and 9.6 kHz quadrature phase shift keyed (QPSK) signals, respectively. The top plots in those figures show the measured Doppler offset by the two embodiments. Furthermore, these plots match closely to FIG. 4F. The bottom left plots show the constellation of the signals after the invention corrected for the time-varying Doppler offset followed by a demodulation stage. The bottom right plots show a spectrum comparison between the input and the output of the invention. As shown, the two embodiments corrected for the frequency offset and the spectrum of the output signal is centered at 0 Hz. Like the simulations of FIGS. 4A-4F, additive white Gaussian noise and time-varying Doppler offset have been introduced to all the signals created in GNU Radio. All the signals that are being fed into the two embodiments have a signal-to-noise ratio of 9 dB, initial frequency offset of 8 kHz and a rate of change of Doppler of −75 Hz/sec. These figures demonstrate embodiments of the subject matter discussed herein and are not so limited.

From the above description of a Signal-Agnostic Apparatus, System, and Method for Doppler Correction, it is manifest that various techniques may be used for implementing the concepts of a frequency locked loop apparatus for correcting Doppler frequency offset, a frequency locked loop system for correcting Doppler frequency offset, and a method of Doppler correction for signals without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that a frequency locked loop apparatus for correcting Doppler frequency offset, a frequency locked loop system for correcting Doppler frequency offset, and a method of Doppler correction for signals are not limited to the particular embodiments described herein but is capable of many embodiments without departing from the scope of the claims.

What is claimed:

1. A frequency locked loop apparatus for correcting Doppler frequency offset, comprising:

an amplitude normalizer configured to receive a signal from a signal input, wherein the signal has a Doppler frequency offset;

a positive frequency band edge filter having a plurality of positive band edge coefficients, electrically connected to the amplitude normalizer, and operable to provide an output containing positive frequency content;

a negative frequency band edge filter having a plurality of negative band edge coefficients, electrically connected to the amplitude normalizer, and operable to provide an output containing negative frequency content;

a means for calculating a raw Doppler frequency offset electrically connected to the positive frequency band edge filter and the negative frequency band edge filter, wherein the calculation comprises the positive frequency content output and the negative frequency content output;

a leaky integrator electrically connected to the means for calculating the raw Doppler frequency offset, and configured to average the raw Doppler frequency offset;

a zero-crossing counter electrically connected to the leaky integrator, configured to increment, wherein the counter increments each time the raw Doppler frequency offset changes sign;

a plurality of locking filters selectively connected to the leaky integrator and configured to refine the raw Doppler frequency offset, and wherein the plurality of locking filters are selected if the zero-crossing counter increases less often than a count update threshold;

a plurality of tracking filters connected to the leaky integrator and configured to refine the raw Doppler frequency offset, and wherein the plurality of tracking filters are selected if the zero-crossing counter increments more often than the count update threshold;

an array further comprising a plurality of refined Doppler offsets selectively connected to the plurality of locking filters or the plurality of tracking filters; and a numerically controlled oscillator, electrically connected to the means for storing a plurality of refined Doppler offsets and to the signal input, and configured to provide the corrective Doppler frequency offset to the signal, wherein the corrective Doppler frequency offset is determined by the plurality of refined Doppler offsets.

2. The frequency locked loop apparatus for correcting Doppler frequency offset of claim 1, wherein the plurality of locking filters is on wide-bandwidth PI filters and the plurality of tracking filters is one narrow-bandwidth PI filter.

3. The frequency locked loop apparatus for correcting Doppler frequency offset of claim 1, wherein the narrowness of at least one of the plurality of tracking filters is the median value of the array comprising a plurality of refined Doppler offsets.

4. The frequency locked loop apparatus for correcting Doppler frequency offset of claim 1, wherein the plurality of positive band edge filter coefficients and the plurality of negative band edge filter coefficients are continuously adjusted in response to an instantaneous measurement of frequency error or an increment count.

5. The frequency locked loop apparatus for correcting Doppler frequency offset of claim 1, wherein the signal is sourced from a satellite in low-Earth orbit, or in the case wherein the signal is sourced from an Earth ground station and the frequency locked loop apparatus is located on a satellite in low-Earth orbit.

6. The frequency locked loop apparatus for correcting Doppler frequency offset of claim 1, wherein the band edge filters are based on a half-bandwidth prototype of lowpass filters.

7. The frequency locked loop system for correcting Doppler frequency offset of claim 6, wherein the narrowness of the narrow-bandwidth PI loop filter is the median value of the array comprising a plurality of refined Doppler offsets.

8. The frequency locked loop system for correcting Doppler frequency offset of claim 6, wherein the plurality of positive band edge filter coefficients and the plurality of negative band edge filter coefficients are continuously adjusted in response to an instantaneous measurement of frequency error or an increment count.

9. The frequency locked loop system for correcting Doppler frequency offset of claim 6, wherein the signal is sourced from a satellite in low-Earth orbit.

10. The frequency locked loop system for correcting Doppler frequency offset of claim 6, wherein the band edge filters are based on a half-bandwidth prototype of lowpass filters.

11. The method of Doppler correction for signals of claim 10, wherein determining an updated Doppler offset comprises:

determining the median of the plurality of refined Doppler offsets.

12. The method of Doppler correction for signals of claim 11, wherein determining a plurality of band edge filter coefficients further comprises:

providing orbital characteristics of a signal source;

computing a maximum and a minimum Doppler frequency offset;

selecting a bandwidth of a low-pass filter with a bandwidth equal to the maximum Doppler frequency offset plus a maximum bandwidth of the signal;

multiplying the time series of the low pass filter by a window function;

frequency shifting a plurality of time series coefficients to the maximum Doppler frequency offset and the minimum Doppler frequency offset;

generating a ramp function the steps further comprising:

defining a ramp function in a frequency domain, converting the ramp function into a time-domain series, truncating the time series, multiplying the time series by a window function;

convolving the ramp function with the plurality of time series coefficients; and producing a plurality of positive band edge filter coefficients and a plurality of negative band edge filter coefficients.

13. The method of Doppler correction for signals of claim 11, wherein the plurality of positive band edge filter coefficients and the plurality of negative band edge filter coefficients are continuously adjusted in response to an instantaneous measurement of frequency error or an increment count.

14. The method of Doppler correction for signals of claim 10, wherein the signal is sourced from a satellite in low-Earth orbit.

15. The method of Doppler correction for signals of claim 10, wherein the band edge filters are based on a half-bandwidth prototype of lowpass filters.

16. A frequency locked loop system for correcting Doppler frequency offset, comprising:

an amplitude normalizer configured to receive a signal having a Doppler frequency offset;

a positive frequency band edge filter having a plurality of positive band edge coefficients, electrically connected to the amplitude normalizer, and operable to provide a positive frequency content filter output;

a negative frequency band edge filter having a plurality of negative band edge coefficients, electrically connected to the amplitude normalizer, and operable to provide a negative frequency content filter output;

a means for calculating a raw Doppler frequency offset electrically connected to the amplitude normalizer, wherein the calculation comprises the positive frequency content filter output and the negative frequency content filter output;

a leaky integrator electrically connected to the means for calculating the raw Doppler frequency offset, and configured to average the raw Doppler frequency offset over an interval;

a zero-crossing counter electrically connected to the leaky integrator, configured to increment, wherein the counter increments each time the raw Doppler frequency offset changes sign;

a wide-bandwidth proportional-integral (PI) loop filter selectively connected to the leaky integrator and configured to refine the raw Doppler frequency offset and wherein the wide-bandwidth proportional-integral (PI) loop filter is selected until the zero-crossing counter reaches an increment threshold;

a narrow-bandwidth PI loop filter selectively connected to the leaky integrator and configured to refine the raw Doppler frequency offset and wherein the narrow-bandwidth proportional-integral (PI) loop filter is selected if the zero-crossing counter reaches the increment threshold;

an array further comprising a plurality of refined Doppler offsets selectively connected to the wide-bandwidth PI loop filter or the narrow-bandwidth PI loop filter; and a numerically controlled oscillator, electrically connected to the means for storing a plurality of refined Doppler offsets and to the amplitude normalizer, and configured to provide the corrective Doppler frequency offset to the signal, wherein the corrective Doppler frequency offset is determined by the plurality of refined Doppler offsets.

17. A method of Doppler correction for signals, the steps comprising:

(a) determining a plurality of band edge filter coefficients for a positive band edge filter and a negative band edge filter;

(b) receiving a signal having a Doppler frequency offset;

(c) normalizing the amplitude of the signal;

(d) passing the signal into the positive band edge filter and the negative band edge filter;

(e) calculating a raw Doppler offset;

(f) averaging the raw Doppler offset;

(g) incrementing a count of a zero-crossing counter when the raw Doppler offset changes sign;

(h) refining the raw Doppler offset by locking or tracking the signal based on the counter updates, wherein if the counter increases less often than a count update threshold, locking the signal through a wide-loop proportional-integral filter, and if the counter increases more often the count update threshold, tracking the signal through a narrow-loop proportional-integral filter;

(i) storing a refined Doppler offset in an array, wherein the array comprises a plurality of refined Doppler offsets;

(j) determining an updated Doppler offset;

(k) recombing the signal with the updated Doppler offset to cancel the Doppler frequency offset; and (l) repeating steps (d)-(l) to continuously refine the Doppler frequency offset.

* * * * *